US009040216B2

(12) United States Patent
Fukudome et al.

(10) Patent No.: US 9,040,216 B2
(45) Date of Patent: May 26, 2015

(54) TONER

(71) Applicant: CANON KABUSHIKI KAISHA, Tokyo (JP)

(72) Inventors: Kosuke Fukudome, Tokyo (JP); Shuhei Moribe, Mishima (JP); Satoshi Mita, Mishima (JP); Kazuo Terauchi, Numazu (JP); Yojiro Hotta, Mishima (JP); Tetsuya Ida, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/095,963

(22) Filed: Dec. 3, 2013

(65) Prior Publication Data

US 2014/0178812 A1   Jun. 26, 2014

Related U.S. Application Data

(63) Continuation of application No. PCT/JP2013/003837, filed on Jun. 20, 2013.

(30) Foreign Application Priority Data

Jun. 22, 2012   (JP) ................. 2012-141016

(51) Int. Cl.
G03G 9/087 (2006.01)
C08G 63/16 (2006.01)
C08G 63/19 (2006.01)
C08L 67/02 (2006.01)
C08L 67/03 (2006.01)

(52) U.S. Cl.
CPC ............ *G03G 9/08755* (2013.01); *C08G 63/16* (2013.01); *C08G 63/19* (2013.01); *C08L 67/02* (2013.01); *C08L 67/03* (2013.01); *G03G 9/08795* (2013.01); *G03G 9/08797* (2013.01)

(58) Field of Classification Search
CPC .......... G03G 9/08755; G03G 9/08795; G03G 9/08797
USPC ....................................... 430/109.4
See application file for complete search history.

(56) References Cited

U.S. PATENT DOCUMENTS

| | | | |
|---|---|---|---|
| 8,329,375 B2 | 12/2012 | Nakazawa et al. | |
| 8,338,066 B2 | 12/2012 | Nozaki et al. | |
| 8,486,597 B2 | 7/2013 | Yamamoto et al. | |
| 2011/0294064 A1* | 12/2011 | Miyaake et al. | 430/109.4 |
| 2012/0058425 A1 | 3/2012 | Shu | |
| 2013/0344430 A1 | 12/2013 | Terauchi et al. | |
| 2014/0099577 A1 | 4/2014 | Moribe et al. | |
| 2014/0099578 A1 | 4/2014 | Hotta et al. | |

FOREIGN PATENT DOCUMENTS

| | | | |
|---|---|---|---|
| JP | 2005-213442 A | 8/2005 |
| JP | 2006-113473 A | 4/2006 |
| JP | 2007-33773 A | 2/2007 |
| JP | 2010-85969 A | 4/2010 |
| JP | 2010-122370 A | 6/2010 |
| JP | 2010-152102 A | 7/2010 |
| JP | 2011-232738 A | 11/2011 |
| JP | 2011-242556 A | 12/2011 |
| JP | 2012-58425 A | 3/2012 |

OTHER PUBLICATIONS

PCT International Search Report and Written Opinion of the International Searching Authority, International Application No. PCT/JP2013/003837, Mailing Date Jul. 16, 2013.

Fedors, "A Method for Estimating Both the Solubility Parameters and Molar Volumes of Liquids", Polymer Engineering and Science, vol. 14, No. 2, 1974, pp. 147-154.

* cited by examiner

*Primary Examiner* — Peter Vajda

(74) *Attorney, Agent, or Firm* — Fitzpatrick, Cella, Harper & Scinto

(57) ABSTRACT

Provided is a toner satisfying low-temperature fixing performance and long-term storage stability of fixed images. Further, provided is a toner capable of obtaining toner images excellent in long-term storage stability irrespective of use environments even in the case where images are formed by a high-speed fixing system having low internal pressure of a fixing nip of a fixing device and a high printing speed. The toner includes toner particles containing a binder resin having a resin A and B, and a coloring agent, in which the resin A includes a resin including a moiety capable of forming a crystalline structure; the resin B includes a resin free of a moiety capable of forming a crystalline structure; and $\Delta H_{high}$ and $\Delta H_{low}$ satisfy the expressions:

$$2 \leq \Delta H_{high} \leq 45$$

$$3[\%] \leq \{(\Delta H_{low} - \Delta H_{high})/\Delta H_{low}\} \times 100 \leq 70[\%]$$

where $\Delta H_{high}$ and $\Delta H_{low}$ represent a heat of melting derived from the binder resin measured at a temperature increase speed of 100° C./min and 10° C./min, respectively.

7 Claims, No Drawings

TONER

CROSS-REFERENCE TO RELATED APPLICATIONS

This application is a continuation of International Application No. PCT/JP2013/003837, filed Jun. 20, 2013, which claims the benefit of Japanese Patent Application No. 2012-141016, filed Jun. 22, 2012.

BACKGROUND OF THE INVENTION

1. Field of the Invention

The present invention relates to a toner to be used for electrophotography, an image formation method for visualizing an electrostatic charge image, and a toner jet method.

2. Description of the Related Art

As general electrophotography, there has been known a method involving forming a latent image on an image bearing member (photosensitive member), visualizing the latent image by supplying a toner to the latent image, transferring the toner image onto a transfer member such as paper, and fixing the toner image onto the transfer member with heat or pressure to obtain a duplicate.

In order to save power and shorten wait time in an electrophotographic apparatus, an on-demand type fixing device has been put into practical use as a fixing device, the on-demand type fixing device including a combination of a ceramic heater having small heat capacity and a film.

In the above-mentioned fixing device, an attempt has been made to reduce an internal pressure of a fixing nip of the fixing device from the viewpoints of prolonging life and handling various media.

Further, along with the recent increase in printing speed, the time during which a toner and a medium such as paper pass through a nip of the fixing device is becoming short year after year.

Further, in recent years, there are increasing chances that users output graphic images each having a high printing ratio, such as image data and posters captured by digital cameras, mobile terminals, and the like, through use of an image forming apparatus such as a laser printer (LBP).

Against such backgrounds, there has been a demand for a toner which exhibits excellent low-temperature fixability even in the case where an image having a high printing ratio is formed under severer fixing condition in which the time during which a toner and a medium pass through a nip is short and the internal pressure of a fixing nip is reduced.

In order to achieve low-temperature fixing of a toner, there has been reported a toner containing a crystalline resin as well as an amorphous resin as a binder resin.

It has been known that low-temperature fixability can be improved when a crystalline resin is contained as a binder resin because the crystalline resin is melted in the vicinity of a melting point and becomes compatible with an amorphous resin to soften the binder resin.

However, when the compatibility between the amorphous resin and the crystalline resin is too high, the following problem arises. The crystalline resin becomes hard to crystallize in the toner, crystal formation in the toner after production and in a toner image after fixation becomes insufficient, and storage stability thereof reduces.

In contrast, when the compatibility between the amorphous resin and the crystalline resin is low, a crystal of the crystalline resin tends to be formed more easily, but the amorphous resin and the crystalline resin are difficult to be compatible with each other even at a melting point or more. Therefore, it is difficult to improve the low-temperature fixability, in particular, in the case where the time during which a toner and a medium pass through a nip is short and the internal pressure of a fixing nip of the fixing device is low.

In order to solve the above-mentioned problem, there has been known a technology for accelerating crystallization of a crystalline resin to improve heat-resistance storage property of a toner by controlling the cooling rate of a kneaded molten material (Japanese Patent Application Laid-Open No. 2010-122370) or subjecting the cooled kneaded material to heat treatment at particular temperature (Japanese Patent Application Laid-Open No. 2010-152102) during the step of producing a toner.

Certainly, with the above-mentioned technology, toner which contains a crystal of a crystalline resin and which is improved heat-resistance storage property can be obtained.

However, when the toner is remelted during a fixing step, the crystalline resin and the amorphous resin become compatible with each other and do not return to a phase-separated state formed of the crystalline resin and the amorphous resin even when cooled. Therefore, it has been unable to improve the storage stability of transfer paper on which a fixed toner image has been formed. For example, when the transfer paper on which the toner image has been formed is left to stand in an overlapped state or in contact with another member, the toner image adheres to the transfer paper or the member with which the toner image comes into contact in some cases.

Meanwhile, there has been proposed a procedure for accelerating the crystallization of a crystalline resin by adding a crystal nucleating agent to a toner.

As the crystal nucleating agent, there have been proposed an inorganic crystal nucleating agent such as silica (for example, Japanese Patent Application Laid-Open No. 2007-033773) and an organic crystal nucleating agent such as a fatty acid amide (for example, Japanese Patent Application Laid-Open No. 2006-113473).

However, in order to exert the effect of the crystal nucleating agent with an inorganic crystal nucleating agent such as silica, it is necessary to increase the content of the inorganic crystal nucleating agent, with the result that the melt viscosity of the toner increases owing to the filler effect of the inorganic crystal nucleating agent, hence the low-temperature fixability is sometimes impaired.

Further, although the heat-resistance storage property of a produced toner is improved by an organic crystal nucleating agent such as a fatty acid amide, a crystal nucleating agent which is a low-molecular weight compound is segregated on the surface of the toner during the fixing step. As a result, the effect of the crystal nucleating agent becomes insufficient, and the storage stability of a toner image is difficult to be improved.

Further, the crystal nucleating agent contained in a toner is sometimes segregated on the surface thereof with the passage of time, and the chargeability of the toner is degraded in some cases.

Accordingly, there remain a great number of technical problems to be solved for obtaining a toner satisfying both the excellent low-temperature fixability and the excellent storage stability of a fixed toner image, and the conventional toner still has room for improvement.

SUMMARY OF THE INVENTION

In view of the foregoing, the present invention is directed to providing a toner solving the above-mentioned problems.

Specifically, the present invention is directed to providing a toner satisfying both low-temperature fixability and long-term storage stability of a fixed image.

Further, the present invention is directed to providing a toner capable of obtaining a toner image excellent in long-term storage stability irrespective of a use environment even when the image is formed by a high-speed fixing system having a fixing device configuration with a low internal pressure of a fixing nip under high printing speed.

According to one aspect of the present invention, there is provided a toner, including toner particles, each of which contains a binder resin containing a resin A and a resin B, and a coloring agent, in which:

(1) the resin A comprises a resin including a moiety capable of forming a crystalline structure;

(2) the resin B comprises a resin which is free of any moieties capable of forming a crystalline structure; and (3) in a measurement of an endothermic quantity of the toner by the use of an input compensation type differential scanning calorimeter, $\Delta H_{high}$ and $\Delta H_{low}$ satisfy the following relationships of Expressions 1 and 2:

$$2 \leq \Delta H_{high} \leq 45 \quad \text{Expression 1}$$

$$3 \leq \{(\Delta H_{low} - \Delta H_{high})/\Delta H_{low}\} \times 100 \leq 70 \quad \text{Expression 2}$$

where the $\Delta H_{high}$ (J/g) represents a heat of melting derived from the binder resin measured at a temperature increase speed of 100° C./min, and the $\Delta H_{low}$ (J/g) represents a heat of melting derived from the binder resin measured at a temperature increase speed of 10° C./min.

Further features of the present invention will become apparent from the following description of exemplary embodiments.

DESCRIPTION OF THE EMBODIMENTS

Preferred embodiments of the present invention will now be described in detail.

A toner of the present invention is a toner, including toner particles, each of which contains a binder resin containing a resin A and a resin B, and a coloring agent, in which:

(1) the resin A is a resin including a moiety capable of forming a crystalline structure;

(2) the resin B is a resin which is free of any moieties capable of forming a crystalline structure; and (3) in a measurement of an endothermic quantity of the toner by the use of an input compensation type differential scanning calorimeter, $\Delta H_{high}$ and $\Delta H_{low}$ satisfy the following relationships of Expressions 1 and 2:

$$2 \leq \Delta H_{high} \leq 45 \quad \text{Expression 1}$$

$$3 \leq \{(\Delta H_{low} - \Delta H_{high})/\Delta H_{low}\} \times 100 \leq 70 \quad \text{Expression 2}$$

where the $\Delta H_{high}$ (J/g) represents a heat of melting derived from the binder resin measured at a temperature increase speed of 100° C./min, and the $\Delta H_{low}$ (J/g) represents a heat of melting derived from the binder resin measured at a temperature increase speed of 10° C./min.

The inventors of the present invention have earnestly studied a toner containing, as a binder resin, the resin A including a moiety capable of forming a crystalline structure and the resin B free of a moiety capable of forming a crystalline structure.

As a result, the inventors of the present invention have found that it is important that the resin A having the following parts be contained in a toner:

(i) a crystalline part in which a heat of melting is exerted without dependence on a temperature increase speed and a temperature decrease speed; and (ii) a fine crystalline part in which a heat of melting is exerted only under a condition of a low temperature increase speed.

Then, the inventors of the present invention have found that, in a toner containing the crystalline part and the fine crystalline part respectively in particular amounts, both the parts act synergistically, and the toner can satisfy both the excellent low-temperature fixability and the long-term storage stability of a toner image even in the case where the time during which a toner and a medium pass through a nip is short and the internal pressure of a fixing nip of the fixing device is low.

The inventors of the present invention presume that the low-temperature fixability can be improved for the following reason: by virtue of the presence of the crystalline part and the fine crystalline part in the toner, the fine crystalline part accelerates melting of the crystalline part in the case where the toner is heated to a temperature equal to or more than a melting point as in fixing, and the resin A becomes compatible with the resin B rapidly to exert a plasticizing effect.

Accordingly, in the toner of the present invention, the resins A and B become compatible with each other during fixing, and the glass transition temperature (Tg) of the toner reduces greatly by virtue of the plasticizing effect and the melt viscosity thereof also reduces, whereby the low-temperature fixability is improved. However, when the resins A and B remain compatible with each other even at room temperature, the storage stability of the toner is degraded.

The phenomenon in which the storage stability is degraded owing to the compatible state between the resins A and B also applies to a fixed image, and a toner having poor storage stability degrades the storage stability of a fixed toner image.

However, the toner of the present invention has a feature of effecting reversible phase transition in which the resins A and B of the toner have a phase separation structure before the toner is used for forming an image, and the resins A and B become compatible with each other at a fixing temperature and return to the phase separation structure rapidly after fixing. Thus, the excellent storage stability in a toner image is obtained.

As a result of the reversible phase transition, the binder resin in a compatible state during fixing is separated into three phases during cooling: a resin A phase, a resin B phase, and an interface phase between the resins A and B.

In this case, a crystalline part of the crystallized resin A is formed in the resin A phase, and a "fine crystalline part" in which the resins A and B are crystallized while being partially compatible with each other because the resins A and B are not phase-separated completely is formed in the interface phase.

By virtue of the co-existence of the resin A phase having the crystalline part and the interface phase having the fine crystalline part, the low-temperature fixability becomes excellent and the storage stability of a fixed image also becomes excellent because of the enhanced filler effect by the crystalline part, as described above.

Those two kinds of crystalline states in the toner can be quantified by measuring a heat of melting derived from the binder resin in measurement of an endothermic quantity of a toner through use of an input compensation type differential scanning calorimeter.

Specifically, the crystalline states can be quantified by measuring a heat of melting $\Delta H_{high}$ (J/g) derived from the binder resin measured at a temperature increase speed of 100°

C./min and a heat of melting $\Delta H_{low}$ (J/g) derived from the binder resin measured at a temperature increase speed of 10° C./min.

Differential scanning calorimeters are roughly classified into two kinds: a heat flux type and an input compensation type. The heat of melting derived from the binder resin in the present invention needs to be measured with the input compensation type differential scanning calorimeter.

The heat flux type calorimeter heats a sample and a reference with the same heater, and measures a temperature difference caused when the sample absorbs heat and generates heat. The input compensation type calorimeter heats a sample and a reference with separate heaters, with the temperature of the sample being regulated to be the same as that of the reference, and measures a heat quantity required for the regulation.

By virtue of the measurement principle, the input compensation type calorimeter can measure a heat of melting particularly with good accuracy. Further, the heaters are small, and hence the temperature followability of the sample is satisfactory. Thus, the input compensation type calorimeter can accurately grasp a change in heat of melting based on the difference between the temperature increase speed and the temperature decrease speed.

The $\Delta H_{high}$ in the present invention is a heat of melting observed when the toner is melted by increasing its temperature temporarily to 180° C. at a temperature increase speed of 100° C./min and then solidified by being cooled to −10° C. at a temperature decrease speed of 100° C./min, and the temperature is increased again to 180° C. at a temperature increase speed of 100° C./min.

The $\Delta H_{low}$ is a heat of melting determined from the area of an endothermic peak observed when the toner is melted by increasing its temperature temporarily to 180° C. at a temperature increase speed of 10° C./min and then solidified by being cooled to −10° C. at a temperature decrease speed of 10° C./min, and the temperature is increased again to 180° C. at a temperature increase speed of 10° C./min.

More detailed measurement methods are respectively described in examples.

The $\Delta H_{high}$ is derived from a moiety which can be crystallized even in the case where the toner is melted temporarily, and is then cooled and heated at high speed. Therefore, the $\Delta H_{high}$ corresponds to the amount of the crystalline part which has a high crystallization speed, can be phase-separated rapidly to be incorporated into the resin A phase and crystallized.

On the other hand, the $\Delta H_{low}$ is derived from a moiety which can be crystallized in the case where the toner is melted temporarily, and is then cooled and heated at low speed.

Under such a condition, the fine crystalline part present in the interface phase between the resin A and the resin B, the crystallization speed of which is relatively low, is re-crystallized to be incorporated as a crystalline part, in addition to the crystalline part of the resin A phase, and hence the fine crystalline part is observed as an apparent crystalline part.

That is, the $\Delta H_{low}$ indicates a heat of melting corresponding to the sum of those of the crystalline part and the fine crystalline part, and the ratio of the amount of the fine crystalline part with respect to the total amount of crystals present in the toner can be determined from the following expression.

$$\{(\Delta H_{low}-\Delta H_{high})/\Delta H_{low}\}\times 100$$

It is necessary that the $\Delta H_{high}$ of the toner of the present invention satisfy Expression 1 below.

$$2\leq \Delta H_{high}\leq 45 \qquad \text{Expression 1}$$

The toner having a $\Delta H_{high}$ of less than 2 is not preferred because the phase separation does not occur sufficiently in the toner during cooling after fixing, and hence plasticization at room temperature cannot be suppressed, which degrades the heat-resistance storage property of a fixed image.

In order to obtain more excellent heat-resistance storage stability of the fixed image, the $\Delta H_{high}$ is preferably 3 or more, more preferably 9 or more, still more preferably 12 or more.

On the other hand, when the $\Delta H_{high}$ is more than 45, the crystalline part is coarsened owing to the excess crystal growth, and it takes time to melt the crystalline part. Therefore, the $\Delta H_{high}$ of more than 45 is not preferred because the low-temperature fixability of the fixing device where the time during which a toner and a medium pass through a nip is short cannot be improved.

In order to exert the stable low-temperature fixability even in the fixing device where the time during which a toner and a medium pass through a nip is short, the $\Delta H_{high}$ is preferably 35 or less, more preferably 21 or less, still more preferably 18 or less.

Regarding the toner of the present invention, the $\{(\Delta H_{low}-\Delta H_{high})/\Delta H_{low}\}\times 100$, which is a ratio of the amount of the fine crystalline part with respect to the total amount of the crystals present in the toner, needs to satisfy Expression 2 below.

$$3\leq \{(\Delta H_{low}-\Delta H_{high})/\Delta H_{low}\}\times 100\leq 70 \qquad \text{Expression 2}$$

In the case where the $\{(\Delta H_{low}-\Delta H_{high})/\Delta H_{low}\}\times 100$ is less than 3, the ratio of the amount of the fine crystalline part with respect to that of the crystalline part is too small, and hence the effect of accelerating melt of the crystalline part due to the fine crystalline part during fixing is not exerted. Therefore, the above-mentioned case is not preferred because the low-temperature fixability of the fixing device where the internal pressure of a fixing nip is low cannot be improved particularly.

In order to allow the toner to exhibit the satisfactory low-temperature fixability even in the fixing device where the internal pressure of a fixing nip is low, the $\{(\Delta H_{low}-\Delta H_{high})/\Delta H_{low}\}\times 100$ is preferably 8 or more, more preferably 10 or more.

On the other hand, it is not preferred that the $\{(\Delta H_{low}-\Delta H_{high})/\Delta H_{low}\}\times 100$ be more than 70, because the toner in an image portion shrinks to cause curling with the passage of time in the case where a solid fixed image is stored for a long period of time under a high-temperature and high-humidity environment.

This is presumed to be caused as follows: a great amount of moiety which has become a fine crystalline part without being incorporated as a crystalline part owing to the low crystallization speed is present, is gradually re-crystallized under the high-temperature and high-humidity environment to be incorporated as a crystalline part, and becomes dense, which causes a reduction in volume of a toner image.

In order to further enhance the long-term storage stability of an image, the $\{(\Delta H_{low}-\Delta H_{high})/\Delta H_{low}\}\times 100$ is preferably 50 or less, more preferably 40 or less.

In order to control the $\Delta H_{high}$ and the $\{(\Delta H_{low}-\Delta H_{high})/\Delta H_{low}\}\times 100$ to the preferred ranges of the present invention, it is important to obtain a configuration capable of being subjected to reversible phase transition by: using a high-crystalline resin as the resin A; and setting the difference in SP value between the resin A and the resin B in a predetermined range.

In particular, it is preferred that the resin A of the present invention be a resin in which a crystal nucleating agent is bonded to an end of a molecule forming a resin part.

Even when the resin A and the resin B become compatible temporarily at a melting point or more, the crystal nucleating agent part (moiety formed when the crystal nucleating agent is bonded to an end of a resin molecule) of the resin A is crystallized rapidly to form a crystal nucleus during cooling. The phase separation is induced when the crystal growth of the resin A occurs with respect to the crystal nucleus, and reversible phase transition can be performed. Thus, the toner having the $\Delta H_{high}$ in the preferred range of the present invention can be obtained.

Further, according to the study by the inventors of the present invention, the crystal nucleating agent is bonded to an end of a molecule forming the resin part, and thus a fine crystalline part can be formed in an interface phase, and a toner having the above-mentioned $\{(\Delta H_{low}-\Delta H_{high})/\Delta H_{low}\}\times 100$ can be obtained.

The reason for this is not clear. However, the following is presumed. Conventionally, the resin A and the resin B completely become compatible in an interface phase. In contrast, the crystal nucleating agent becomes a crystal nucleus, whereby part of a moiety in the vicinity of an end of a resin molecule of the resin A can be oriented selectively to form a fine crystalline part.

Although no particular limitation is imposed on the crystal nucleating agent as long as the crystal nucleating agent is a compound having a crystallization speed higher than that of a molecule forming the resin part of the resin A, from the viewpoint of a high crystallization speed, it is preferred that the crystal nucleating agent be a compound having a main chain containing a hydrocarbon-based moiety and having a mono- or higher-valent functional group capable of reacting with the end of the resin molecule.

From the viewpoint of more easily enhancing the crystallization speed, it is preferred that the crystal nucleating agent be a compound in which the hydrocarbon-based moiety is a straight chain and the functional group is monovalent. Further, from the viewpoint of enhancing the reactivity between the crystal nucleating agent and the end of the resin part of the resin A, the molecular weight of the crystal nucleating agent is preferably 100 to 10,000, more preferably 150 to 5,000.

More specifically, the crystal nucleating agent is preferably an aliphatic carboxylic acid having 10 or more and 30 or less carbon atoms and/or an aliphatic alcohol having 10 or more and 30 or less carbon atoms.

It is preferred that the crystal nucleating agent part be a moiety derived from an aliphatic carboxylic acid and/or an aliphatic alcohol having carbon atoms in the above-mentioned number range because a toner in which the $\Delta H_{high}$ and the $\{(\Delta H_{low}-\Delta H_{high})/\Delta H_{low}\}\times 100$ are in the preferred ranges of the present invention is obtained.

As the number of carbon atoms is higher in the above-mentioned number range of carbon atoms, the formation speed of a crystal nucleus increases, and the $\Delta H_{high}$ tends to be larger and the $\{(\Delta H_{low}-\Delta H_{high})/\Delta H_{low}\}\times 100$ tends to be smaller. Conversely, as the number of carbon atoms is smaller, the size of a crystal nucleus becomes smaller, and the $\Delta H_{high}$ tends to be smaller and the $\{(\Delta H_{low}-\Delta H_{high})/\Delta H_{low}\}\times 100$ tends to be larger. Therefore, in order to set the $\Delta H_{high}$ and the $\{(\Delta H_{low}-\Delta H_{high})/\Delta H_{low}\}\times 100$ in more preferred ranges, the number of carbon atoms of the crystal nucleating agent is more preferably 16 or more and 24 or less.

No particular limitation is imposed on the addition amount of the crystal nucleating agent. However, in the case where it is assumed that the total amount of a unit derived from an alcohol monomer and a unit derived from an acid monomer in the resin part of the resin A is 100 parts by mol, the addition amount is preferably 0.1 part by mol or more because the effect of the crystal nucleating agent can be exerted easily, and the addition amount is more preferably 0.2 part by mol or more. Meanwhile, it is preferred that the addition amount be 7.0 parts by mol or less because a fine crystalline part can be formed stably with the excess crystal growth in the toner suppressed, and hence a toner in which the $\{(\Delta H_{low}-\Delta H_{high})/\Delta H_{low}\}\times 100$ is in the preferred range of the present invention is obtained. Further, the addition amount is preferably 7.0 parts by mol or less because the added crystal nucleating agent sufficiently reacts with the end of the resin molecule and the amount of the unreacted crystal nucleating agent becomes small, and the addition amount is more preferably 5.0 parts by mol or less.

Further, in order to cause the resin A and the resin B to effect reversible phase transition, it is important that the resin A have the above-mentioned crystal nucleating agent part and the SP values of the resin A and the resin B are in predetermined ranges.

Specifically, assuming that the SP value of the resin A is Sa $((cal/cm^3)^{1/2})$ and the SP value of the resin B is Sb $((cal/cm^3)^{1/2})$, it is preferred that the Sa and the Sb satisfy Expression 3 below.

$$-0.40 \leq Sb-Sa \leq 0.80 \qquad \text{Expression 3}$$

The SP value (solubility parameter) has been conventionally used as an index indicating, for example, the ease of mixing between resins, and between a resin and a wax, and the Sb−Sa indicates the ease of compatibility between the resins A and B when they are melted and the ease of phase separation thereof at room temperature.

Note that each SP value as used herein was calculated through use of a generally used method of which some are described in Fedors' Poly. Eng. Sci., 14(2) 147 (1974), such as Dunkel, Bowden and Jones, Small, and Rheineck and Lin. The SP value of a monomer forming each resin was calculated based on the above-mentioned method, and an SP value was calculated from a molar ratio of the respective monomers forming the resins.

The inventors of the present invention have found that the resins A and B of the toner of the present invention can become compatible with each other during melting, and in addition, effect reversible phase transition when the above-mentioned crystal nucleating agent is bonded and the Sb−Sa is in a particular range.

As the Sb−Sa is smaller, the compatibility between the resins A and B becomes higher, and the phase separation during cooling becomes insufficient, with the result that the resin A which does not become a crystalline part but becomes a fine crystalline part tends to increase. Therefore, when the Sb−Sa is less than −0.40, the $\{(\Delta H_{low}-\Delta H_{high})/\Delta H_{low}\}\times 100$ becomes too large, and an image is likely to be curled when being left to stand for a long period of time at high temperature.

On the other hand, as the Sb−Sa is larger, the compatibility between the resins A and B is degraded, and the phase separation speed increases during cooling. Therefore, there is a tendency that the fine crystalline part is incorporated as a crystalline part, and the fine crystalline part decreases.

Therefore, when the Sb−Sa becomes more than 0.80, the $\{(\Delta H_{low}-\Delta H_{high})/\Delta H_{low}\}\times 100$ becomes too small, and, in particular, when the internal pressure of a fixing nip is low, the low-temperature fixability becomes difficult to be improved.

Therefore, from the viewpoint that the low-temperature fixability and the storage stability of an image become more excellent, it is preferred that the Sb−Sa be 0.20 or more and 0.70 or less.

Further, it is preferred that the SP value Sa $((cal/cm^3)^{1/2})$ of the resin A satisfy Expression 4 below.

$$9.00 \leq Sa \leq 10.50 \qquad \text{Expression 4}$$

It is preferred that the Sa be in the above-mentioned range because a toner having the $\Delta H_{high}$ and the $\{(\Delta H_{low} - \Delta H_{high})/\Delta H_{low}\} \times 100$ in preferred ranges of the present invention is obtained. The Sa is more preferably 9.70 or more and 10.20 or less.

That the resin A has a low SP value means that, for example, in the case where the resin A described later is a polyester resin containing the aliphatic diol component and the aliphatic dicarboxylic acid component, the number of carbon atoms of the aliphatic diol and/or the aliphatic dicarboxylic acid is large.

When the number of carbon atoms of an aliphatic diol and/or an aliphatic dicarboxylic acid increases, the crystal growth caused by the interaction with the crystal nucleating agent becomes likely to occur. Therefore, when the Sa is smaller, the crystalline part increases and the fine crystalline part decreases. On the other hand, when the Sa is larger, there is a tendency that the crystalline part decreases and the fine crystalline part increases.

Therefore, it is preferred that the SP value Sa be in the above-mentioned range because a toner having the $\Delta H_{high}$ and the $\{(\Delta H_{low} - \Delta H_{high})/\Delta H_{low}\} \times 100$ preferred in the present invention is obtained.

Further, in the toner of the present invention, the $\Delta H_{high}$ can also be adjusted by changing the content of the resin A in the binder resin, and it is preferred that the ratio "resin A:resin B" between the contents of the resin A and the resin B in the toner be 5:95 to 40:60 in terms of mass.

No particular limitation is imposed on the resin A of the present invention as long as the resin A is a resin which contains a moiety capable of forming a crystalline structure and in which a crystal nucleating agent is bonded to an end of a resin molecule as described above.

Note that, containing a moiety capable of forming a crystalline structure as used herein means that there is an endothermic peak at the time of an increase in temperature in measurement with a differential scanning calorimeter (DSC), and the measurement is performed in accordance with the measurement method "ASTM D3418-82."

From the viewpoint of increasing the crystallinity of the polyester molecular chain, an aliphatic diol having 6 to 18 carbon atoms is preferably contained in the alcohol component as a material monomer.

Examples of the aliphatic diol having 6 to 18 carbon atoms include 1,6-hexanediol, 1,7-heptanediol, 1,8-octanediol, 1,9-nonanediol, 1,10-decanediol, 1,11-undecanediol, 1,12-dodecanediol, neopentyl glycol, and 1,4-butenediol.

As a polyhydric alcohol component except the aliphatic diol having 6 to 18 carbon atoms that can be used as an alcohol component, there are given, for example: aromatic diols such as alkylene oxide adducts of bisphenol A represented by the following structural formula (I) including a polyoxypropylene adduct of 2,2-bis(4-hydroxyphenyl)propane and a polyoxyethylene adduct of 2,2-bis(4-hydroxyphenyl)propane; and trihydric or more alcohols such as glycerin, pentaerythritol, and trimethylolpropane.

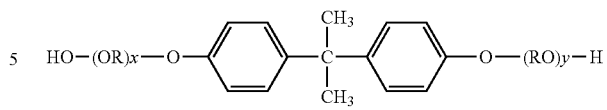

(I)

(In the formula, R represents an alkylene group having 2 or 3 carbon atoms, x and y each represent a positive number, and the sum of x and y is 1 to 16, preferably 1.5 to 5.)

In addition, an aliphatic dicarboxylic acid compound having 6 to 18 carbon atoms is preferably contained in the carboxylic acid component as a material monomer from the viewpoint of increasing the crystallinity of the resin A.

As the aliphatic dicarboxylic acid compound having 6 to 18 carbon atoms, there are given, for example, 1,8-octanedioic acid, 1,9-nonanedioic acid, 1,10-decanedioic acid, 1,11-undecanedioic acid, and 1,12-dodecanedioic acid.

In addition, in the present invention, a carboxylic acid component except the aliphatic dicarboxylic acid compound having 6 to 18 carbon atoms can be used in combination. Examples thereof include, but not particularly limited to, an aromatic dicarboxylic acid compound and a trivalent or more aromatic polycarboxylic acid compound.

The aromatic dicarboxylic acid compound also includes an aromatic dicarboxylic acid derivative capable of becoming the same constitutional unit as that derived from the aromatic dicarboxylic acid by a condensation reaction. Preferred specific examples of the aromatic dicarboxylic acid compound include: aromatic dicarboxylic acids such as phthalic acid, isophthalic acid, and terephthalic acid; anhydrides thereof; and alkyl (1 to 3 carbon atoms) esters thereof. Examples of the alkyl groups of the alkyl esters include a methyl group, an ethyl group, a propyl group, and an isopropyl group.

Examples of the trivalent or more polycarboxylic acid compound include: aromatic carboxylic acids such as 1,2,4-benzenetricarboxylic acid (trimellitic acid), 2,5,7-naphthalenetricarboxylic acid, and pyromellitic acid; anhydrides thereof; and derivatives such as alkyl (1 to 3 carbon atoms) esters thereof.

In addition, it is preferred that the molar ratio between the alcohol component and the carboxylic acid component which are material monomers for a condensation polymerization reaction (carboxylic acid component/alcohol component) be 1.03 or more and 1.20 or less.

It is preferred that a weight-average molecular weight Mwa in gel permeation chromatography (GPC) of a tetrahydrofuran (THF) soluble matter of the resin A be 10,000 or more and 100,000 or less from the viewpoints of the low-temperature fixability and the heat-resistance storage property.

Of those resins A, from the viewpoint that the heat-resistance stability of an image can be improved by causing reversible phase separation stably, preferred as the resin A is an aliphatic polyester resin having a unit derived from an alcohol component and a unit derived from an acid component, with a ratio of a unit derived from an aliphatic diol having 6 or more and 12 or less carbon atoms to the unit derived from the alcohol component being 85 mol % or more, and a ratio of a unit derived from an aliphatic dicarboxylic acid having 6 or more and 14 or less carbon atoms to the unit derived from the acid component being 85 mol % or more. In order to obtain such a resin, it is appropriate that an alcohol component containing 85 mol % or more of an aliphatic diol having 6 or more and 12 or less carbon atoms with respect to the total alcohol component and a carboxylic acid component containing 85 mol % or more of an aliphatic dicarboxylic acid having 6 or more and 14 or less carbon atoms with respect to the total carboxylic acid component be subjected to polymerization condensation.

The above-mentioned aliphatic polyester resin is preferred because the aliphatic polyester resin is a high-crystallinity resin and crystallized to be phase-separated rapidly during cooling, hence provide a toner having the $\Delta H_{high}$ in the preferred range of the present invention.

Further, in the case where the resin A is the above-mentioned preferred aliphatic polyester resin, it is preferred that the relationship between a carbon number C1 of the unit derived from the aliphatic diol of the resin A and a carbon number C2 of the unit derived from the aliphatic dicarboxylic acid satisfy Expression 5 below.

$$-2 \leq C1-C2 \leq 2 \quad \text{Expression 5}$$

It is preferred that the difference between the C1 and the C2 be as small as possible because the stereoregularity of a resin molecule of the resin A increases to enhance the crystallization speed during cooling after fixing, and in particular, the $\Delta H_{high}$ can be increased, whereby the heat-resistance storage property of an image becomes excellent. The C1–C2 is more preferably −1 or more and 1 or less, still more preferably 0.

Further, from the viewpoints of the low-temperature fixability and heat-resistance storage property of the toner, the melting point of the resin A is preferably 60° C. or more and 120° C. or less, more preferably 70° C. or more and 90° C. or less.

Further, it is preferred that the acid value of the resin A be 2 mgKOH/g or more and 40 mgKOH/g or less from the viewpoints of the satisfactory charging characteristics of the toner. It is preferred that the hydroxyl value of the resin A be 2 mgKOH/g or more and 40 mgKOH/g or less from the viewpoints of the fixability and storage stability of the toner.

No particular limitation is imposed on the resin B to be used for the toner of the present invention as long as the resin B is free of a moiety capable of forming a crystalline structure and the above-mentioned Sb–Sa is in a desired range. From the viewpoint of more excellent low-temperature fixability, it is preferred that the resin B be a polyester resin.

Material monomers to be preferably used in the case where the resin B of the present invention is a polyester resin are given below.

As a dihydric alcohol component, there may be used, for example, alkylene oxide adducts of bisphenol A represented by the above-mentioned formula (I) including a polyoxypropylene adduct of 2,2-bis(4-hydroxyphenyl)propane and a polyoxyethylene adduct of 2,2-bis(4-hydroxyphenyl)propane, ethylene glycol, 1,3-propylene glycol, and neopentyl glycol.

In addition, sorbitol, pentaerythritol, dipentaerythritol, or the like can be used as a trihydric or more alcohol component.

A monomer out of those dihydric alcohol components and trihydric or more alcohol components may be used alone, or multiple monomers thereof may be used.

In addition, examples of the dicarboxylic acid component as the acid component include maleic acid, fumaric acid, phthalic acid, isophthalic acid, terephthalic acid, succinic acid, adipic acid, n-dodecenyl succinic acid, anhydrides thereof, and lower alkyl esters thereof.

Examples of the trivalent or more polycarboxylic acid component include 1,2,4-benzenetricarboxylic acid, 2,5,7-naphthalenetricarboxylic acid, pyromellitic acid, Empol trimer acid, anhydrides thereof, and lower alkyl esters thereof.

No particular limitation is imposed on the production method of the resin B, and the resin B can be produced by an esterification reaction or transesterification reaction through use of each of the above-mentioned monomers or the like. When the material monomers are polymerized, an esterification catalyst or the like, which is generally used, such as dibutyltin oxide, may be used appropriately for accelerating the reaction.

A weight-average molecular weight Mwb in gel permeation chromatography (GPC) of a tetrahydrofuran (THF) soluble matter of the resin B of the present invention is preferably 3,000 or more and 100,000 or less, more preferably 4,000 or more and 50,000 or less.

The Mwb is involved in the compatibility between the resin A and the resin B. As the Mwb is smaller, the resin A tends to enter the resin B to become compatible therewith during melting, and in contrast, as the Mwb is larger, the phase separation tends to be induced during cooling. Therefore, it is preferred that the Mwb be in the above-mentioned range because the reversible phase transition is likely to occur, and a toner having the $\Delta H_{high}$ and the $\{(\Delta H_{low}-\Delta H_{high})/\Delta H_{low}\} \times 100$ preferred in the present invention is obtained.

It is preferred that the glass transition temperature (Tg) of the resin B be 45° C. or more and 70° C. or less from the viewpoints of the fixability and the storage property.

Further, when the softening point of the resin B is too high, the compatibility between the resin A and the resin B is reduced and the phase separation between the resins A and B during cooling is accelerated. Therefore, the $\Delta H_{high}$ increases and the $\{(\Delta H_{low}-\Delta H_{high})/\Delta H_{low}\} \times 100$ decreases. In contrast, as the softening point of the resin B is lower, the resin B is more likely to be compatible with the resin A during melting and the phase separation is less likely to occur during cooling. Therefore, the $\Delta H_{high}$ tends to decrease, and the $\{(\Delta H_{low}-\Delta H_{high})/\Delta H_{low}\} \times 100$ tends to increase. In view of the foregoing, in order to obtain a toner having the $\Delta H_{high}$ and the $\{(\Delta H_{low}-\Delta H_{high})/\Delta H_{low}\} \times 100$ in the preferred ranges of the present invention, the softening point of the resin B is preferably 80° C. or more and 130° C. or less, more preferably 90° C. or more and 120° C. or less.

Further, from the viewpoints of the satisfactory charging characteristics of the toner, it is preferred that the acid value of the resin B be 2 mgKOH/g or more and 40 mgKOH/g or less, and the hydroxyl value thereof be 2 mgKOH/g or more and 40 mgKOH/g or less.

The toner of the present invention composed of the resin A and the resin B has a phase separation structure at room temperature. Therefore, a decrease in Tg caused by the compatibility between the resin A and the resin B is suppressed to be small, and the glass transition temperature (Tg) of the toner becomes almost equal to or slightly lower than that of the resin B. Therefore, it is preferred to use the resin B having the glass transition temperature in the above-mentioned range because the toner has a Tg of 40° C. or more and 65° C. or less and becomes excellent in heat-resistance storage property.

In addition, it is preferred that the softening point of the toner be 90° C. or more and 125° C. or less from the viewpoint of the low-temperature fixability of the toner.

Further, it is preferred that the weight-average molecular weight of the toner be 3,000 or more and 100,000 or less from the viewpoints of the fixability and high-temperature offset prevention.

In the present invention, a wax can be used as required to impart releasability to the toner.

In terms of dispersibility in the toner and high releasability, a hydrocarbon-based wax such as low-molecular weight polyethylene, low-molecular weight polypropylene, a microcrystalline wax, or a paraffin wax is preferably used as the wax. One kind of the waxes may be used alone, or two or more kinds thereof may be used in combination in a small amount, if necessary.

The following may be given as specific examples thereof: Biscol (trademark) 330-P, 550-P, 660-P, and TS-200 (Sanyo Chemical Industries, Ltd.); Hiwax 400P, 200P, 100P, 410P, 420P, 320P, 220P, 210P, and 110P (Mitsui Chemicals, Inc.); Sasol H1, H2, C80, C105, and C77 (Schumann Sasol); HNP-1, HNP-3, HNP-9, HNP-10, HNP-11, and HNP-12 (NIPPON SEIRO CO., LTD.); Unilin (trademark) 350, 425, 550, and 700, and Unisid (trademark), Unisid (trademark) 350, 425, 550, and 700 (TOYO-PETROLITE); and a haze wax, a beeswax, a rice wax, a candelilla wax, and a carnauba wax (available from CERARICA NODA Co., Ltd.).

The wax may be added at the time of the melting and kneading during the production of the toner, or may be added at the time of the production of the resin B, and the timing is appropriately selected from existing methods. In addition, one kind of those waxes may be used alone, or two or more kinds thereof may be used in combination.

The content of the wax is preferably 1 part by mass or more and 20 parts by mass or less with respect to 100 parts by mass of the binder resin.

The toner of the present invention may be a magnetic toner or a non-magnetic toner. In the case where the toner of the present invention is used as a magnetic toner, it is preferred to use magnetic iron oxide. Iron oxide such as magnetite, maghemite, or ferrite is used as the magnetic iron oxide. Further, in order to enhance finely dispersing ability of the magnetic iron oxide in toner particles, it is preferred that slurry of the magnetic iron oxide during production be sheared so that the magnetic iron oxide can be loosed temporarily.

In the present invention, the amount of the magnetic iron oxide to be contained in the toner is preferably 25 mass % or more and 45 mass % or less, more preferably 30 mass % or more and 45 mass % or less in the toner.

In the case where the toner of the present invention is used as a non-magnetic toner, carbon black, and conventionally known various pigments and dyes can be used alone or in combination of at least two kinds as a coloring agent.

The content of the coloring agent is preferably 0.1 part by mass or more and 60.0 parts by mass or less, more preferably 0.5 part by mass or more and 50.0 parts by mass or less with respect to 100.0 parts by mass of the binder resin.

Further, in the toner of the present invention, inorganic fine powder may be present on the surfaces of toner particles.

For example, a flowability improver can be used as the inorganic fine powder. Any improver can be used as the flowability improver as long as it can increase flowability by being externally added to the toner particles, compared to that before the addition.

For example, there are given the following: fluorine-based resin powder such as vinylidene fluoride fine powder or polytetrafluoroethylene fine powder; fine powder silica such as wet process silica or dry process silica; and treated silica obtained by subjecting any such silica to surface treatment with, for example, a silane coupling agent, a titanium coupling agent, or silicone oil. As the preferred flowability improver, there is given silica fine powder produced by vapor phase oxidation of a silicon-halogen compound, the fine powder being called dry process silica or fumed silica. For example, such fine powder is produced through use of a pyrolysis oxidation reaction of a silicon tetrachloride gas in oxygen and hydrogen, and a reaction formula is as described below.

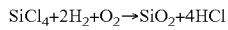

$$SiCl_4 + 2H_2 + O_2 \rightarrow SiO_2 + 4HCl$$

Further, the flowability improver may be composite fine powder of silica and another metal oxide obtained by using another metal halogen compound such as aluminum chloride or titanium chloride together with the silicon-halogen compound during the production process.

Further, it is preferred to use treated silica fine powder obtained by hydrophobizing silica fine powder produced by vapor phase oxidation of the silica-halogen compound. In the treated silica fine powder, it is particularly preferred that silica fine powder be treated so that the hydrophobized degree titrated by a methanol titration test exhibits a value in the range of 30 or more and 98 or less.

Hydrophobicity is imparted through chemical treatment with an organosilicon compound that reacts with or physically adsorbs to the silica fine powder. The hydrophobizing treatment is preferably performed by a method involving treating the silica fine powder produced by vapor phase oxidation of the silicon-halogen compound with the organosilicon compound. Examples of the organosilicon compound include the following: hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilylmercaptan, trimethylsilylmercaptan, triorganosilyl acrylate, vinyldimethylacetoxysilane, dimethylethoxysilane, dimethyldimethoxysilane, diphenyldiethoxysilane, 1-hexamethyldisiloxane, 1,3-divinyltetramethyldisiloxane, 1,3-diphenyltetramethyldisiloxane, and dimethylpolysiloxane having 2 to 12 siloxane units per molecule and containing a hydroxyl group bonded to one Si atom in a unit positioned at the end. One kind thereof is used alone, or two or more kinds thereof are used as a mixture.

The silica fine powder may be treated with silicone oil, and may be subjected to the treatment in addition to the hydrophobizing treatment.

As preferred silicone oil, there is used one having a viscosity at 25° C. of 30 mm²/s or more and 1,000 mm²/s or less. For example, dimethyl silicone oil, methylphenyl silicone oil, α-methylstyrene-modified silicone oil, chlorophenyl silicone oil, or fluorine-modified silicone oil is particularly preferred.

As a treatment method of silicone oil, there are given the following methods: a method involving directly mixing silica fine powder treated with a silane coupling agent and silicone oil with a mixer such as a Henschel mixer; a method involving spraying silicone oil to silica fine powder serving as a base; and a method involving dissolving or dispersing silicone oil in an appropriate solvent, adding and mixing silica fine powder to the resultant solution, and removing the solvent. In the silicone oil-treated silica, it is more preferred to heat silica to a temperature of 200° C. or more (still more preferably 250° C. or more) in an inactive gas after treating the silica with silicone oil, thereby stabilizing a coat on the surface of the silica.

As a preferred silane coupling agent, there is given hexamethyldisilazane (HMDS).

In the present invention, it is preferred that silica be treated with a coupling agent in advance and then be treated with silicone oil, or that silica be treated with a coupling agent and silicone oil simultaneously.

The addition amount of the inorganic fine powder is preferably 0.01 part by mass or more and 8.00 parts by mass or less, more preferably 0.10 part by mass or more and 4.00 parts by mass or less with respect to 100.00 parts by mass of the toner particles.

Other additives may be added to the toner of the present invention as necessary. Examples of the additives include an auxiliary charging agent, a conductivity imparting agent, a caking inhibitor, a release agent for heat roller fixing, a lubricant, and resin fine particles and inorganic fine particles serving as an abrasive.

Examples of the lubricant include polyethylene fluoride powder, zinc stearate powder, and polyvinylidene fluoride powder. Of those, the polyvinylidene fluoride powder is preferred. Examples of the abrasive include cerium oxide powder, silicon carbide powder, and strontium titanate powder. The toner of the present invention can be obtained by sufficiently mixing such external additive with the toner particles with a mixer such as a Henschel mixer.

The toner of the present invention can be used as a one-component type developer and can also be used as a two-component type developer by being mixed with a magnetic carrier.

As the magnetic carrier, for example, there may be used generally known carriers including: magnetic materials such as iron powder whose surface is oxidized or unoxidized iron powder, particles of metals such as iron, lithium, calcium, magnesium, nickel, copper, zinc, cobalt, manganese, and rare earths, particles of alloys thereof, and particles of oxides thereof, and ferrite; and a magnetic material-dispersed resin carrier (so-called resin carrier) containing a magnetic material and a binder resin holding the magnetic material in a dispersed state.

When the toner of the present invention is mixed with the magnetic carrier so as to be used as a two-component type developer, the mixing ratio of the magnetic carrier is adjusted so that the concentration of the toner in the developer is preferably 2 mass % or more and 15 mass % or less.

Although no particular limitation is imposed on the production method for the toner of the present invention, it is preferred to use a pulverizing method involving the production steps of melting and kneading the resin A and the resin B and then cooling and solidifying the resultant from the viewpoint of obtaining a toner more excellent in low-temperature fixability.

The pulverizing method is preferred for the following reason: a molecular chain of the resin A can enter the resin B easily by mixing the resins A and B with shearing during melting and kneading, and hence the binder resin can be compatibilized uniformly during melting, whereby the low-temperature fixability can be enhanced.

Hitherto, in the case of using the pulverizing method, because the crystallinity of the resin A and the compatibility between the resin A and the resin B have not been controlled enough, once the resins A and B are compatibilized, it is difficult to form a crystalline part or a fine crystalline part in a toner.

However, by causing reversible phase transition due to control the difference in SP value between the resin A and the resin B or use the resin A in which a crystal nucleating agent is bonded to an end of a resin molecule, a toner having the desired $\Delta H_{high}$ and $\{(\Delta H_{low}-\Delta H_{high})/\Delta H_{low}\}\times 100$ can be obtained.

In the material mixing step, as materials for constituting the toner particles, for example, the resin A, the resin B, the coloring agent, and any other additive are weighed in predetermined amounts, and then blended and mixed. An apparatus for the mixing is, for example, a double cone mixer, a V type mixer, a drum type mixer, a Super mixer, a Henschel mixer, a Nauta mixer, or a Mechano Hybrid (manufactured by NIPPON COKE & ENGINEERING CO., LTD.).

Next, the mixed materials are melted and kneaded so that the coloring agent and the like may be dispersed in the binder resin formed of the resin A and the resin B. In the melting and kneading step, a batch type kneading machine such as a pressure kneader or a Banbury mixer, or a continuous kneading machine can be used, and a single or twin screw extruder is mainly used because of an advantage in that continuous production can be performed. Examples thereof include a KTK type twin screw extruder (manufactured by KOBE STEEL, LTD.), a TEM type twin screw extruder (manufactured by Toshiba Machine Co., Ltd.), a PCM kneader (manufactured by Ikegai Corp.), a twin screw extruder (manufactured by KCK), a co-kneader (manufactured by BUSS), and a Kneadex (manufactured by NIPPON COKE & ENGINEERING CO., LTD.).

Further, it is preferred that a resin composition to be obtained by the melting and kneading be rolled with a two-roll mill or the like, and be cooled with water or the like in a cooling step.

Next, in a pulverizing step, the cooled resin composition is pulverized so as to have a desired particle diameter. In the pulverizing step, for example, the cooled resin composition is coarsely pulverized with a pulverizer such as a crusher, a hammer mill, or a feather mill, and is then further finely pulverized with, for example, a Kryptron System (manufactured by Kawasaki Heavy Industries, Ltd.), a Super Rotor (manufactured by Nisshin Engineering Inc.), a Turbo Mill (manufactured by FREUND-TURBO CORPORATION), or a fine pulverizer of an air-jet system.

After that, as required, the pulverized product is classified with a classifier or a sieving machine, such as an Elbow Jet (manufactured by Nittetsu Mining Co., Ltd.) of an inertial classification system, a TSP Separator (manufactured by Hosokawa Micron Corporation), a Faculty (manufactured by Hosokawa Micron Corporation), or a Turboplex (manufactured by Hosokawa Micron Corporation) of a centrifugal force classification system. Thus, toner particles are obtained.

Further, as required, the pulverized product may be subjected to surface modification for toner particles such as spheroidization treatment using a Hybridization System (manufactured by Nara Machinery Co., Ltd.), a Mechanofusion System (manufactured by Hosokawa Micron Corporation), a Faculty (manufactured by Hosokawa Micron Corporation), or a Meteorainbow MR Type (manufactured by Nippon Pneumatic Mfg. Co., Ltd.).

Further, if necessary, a desired additive can be sufficiently mixed with the toner particles with a mixer such as a Henschel mixer to provide the toner of the present invention.

Methods of measuring physical properties of the resin and toner of the present invention are as described below. Examples described later are also based on the following methods.

<Measurement of $\Delta H_{high}$, $\Delta H_{low}$>

The $\Delta H_{high}$ and $\Delta H_{low}$ of the toner were measured under the following conditions through use of an input compensation type differential scanning calorimeter "DSC8500" (manufactured by PerkinElmer, Inc.).

First, calibration files under the respective conditions of a temperature increase speed of 100° C./min and a temperature increase speed of 10° C./min were created according to the following procedure.

A. Creation of Calibration File (1) Base Line Measurement

Base line measurement was conducted in accordance with the following program under the condition of a nitrogen flow rate of 30 ml/min with Pt covers being attached to a reference part and a measurement part which were both in an empty state. In this case, a calibration file at a temperature increase speed of 10° C./min obtained from a manufacturer at the time of purchase was used.

Step 1: Keep the temperature at −70° C. for 5 minutes.

Step 2: Increase the temperature from −70° C. to 500° C. at a desired temperature increase speed (100° C./min or 10° C./min).

(2) Measurement of Melting Start Temperature and Heat of Melting of Indium

A reference pan was inserted into the reference part, and an indium pan was inserted into the measurement part. Then, the Pt covers were attached respectively to the reference part and the measurement part, and measurement was conducted in accordance with the following program at a nitrogen flow rate of 30 ml/min.

Step 1: Keep the temperature at 30° C. for 2 minutes.

Step 2: Increase the temperature from 30° C. to 500° C. at a desired temperature increase speed (100° C./min or 10° C./min).

The melting start temperature and heat of melting of indium at each temperature increase speed were determined from the analysis of the measurement result of indium thus obtained. In this case, a calibration file at a temperature increase speed of 10° C./min obtained from a manufacturer at the time of purchase was used.

(3) Creation of Calibration File at Each Temperature Increase Speed

A calibration file at each temperature increase speed was created by performing base line calibration, sample temperature calibration, furnace calibration, and heat flow calibration according to the following procedure.

Regarding the base line calibration, base line calibration values (slope, balance rough adjustment, balance fine adjustment) were adjusted by being increased or decreased with reference to the curve of the base line obtained in the section (1) so as to provide a flat base line.

Regarding the sample temperature calibration, the sample temperature was calibrated manually through use of the measured value of the melting start temperature of indium obtained in the section (2) and a theoretical temperature (156.6° C.) so that the measured value became the theoretical temperature.

Regarding the furnace calibration, the furnace was calibrated by performing autorun in the measurement temperature range of 50 to 350° C.

Regarding the heat flow calibration, the heat flow was calibrated manually through use of the measured value of the heat of melting of indium obtained in the section (2) and a heat of melting theoretical value (28.45 J/g) so that the measured value became the heat of melting theoretical value.

B. Measurement of $\Delta H_{High}$ (Temperature Increase Speed: 100° C./min)

About 5 mg of a sample were precisely weighed and put in a pan made of aluminum to provide a sample pan. The sample pan was inserted into the measurement part, and an empty pan made of aluminum as a reference was inserted into the reference part. The Pt covers were attached respectively to the measurement part and the reference part.

Then, the endothermic quantity of the toner was measured in accordance with the following temperature program under a condition of a nitrogen flow rate of 30 ml/min through use of a calibration file created at a temperature increase speed of 100° C./min.

Step 1: Keep the temperature at −10° C. for 5 minutes.

Step 2: Increase the temperature from −10° C. to 180° C. at a temperature increase speed of 100° C./min.

Step 3: Keep the temperature at 180° C. for 10 minutes.

Step 4: Decrease the temperature from 180° C. to −10° C. at a temperature decrease speed of 100° C./min.

Step 5: Keep the temperature at −10° C. for 10 minutes.

Step 6: Increase the temperature from −10° C. to 180° C. at a temperature increase speed of 100° C./min.

The endothermic quantity was measured in accordance with the program, and the endothermic quantity curve obtained in Step 6 (second temperature increase process) was analyzed for heat of melting. Specifically, the $\Delta H_{high}$ was determined from the area of a peak derived from the resin A among endothermic peaks having appeared on an endothermic side with respect to the base line.

Further, in the case where the toner contains a wax in addition to the resin A, the melting peak temperature of the resin A is close to that of the wax, and hence the melting peaks overlap each other, resulting in difficulty in peak separation in some cases.

In such a case, first, regarding the endothermic quantity curve obtained in Step 6 of the toner, a sum $\Delta H_{high}1$ of the heat of melting of the resin A and that of the wax is determined from the total area of the overlapping melting peaks of the resin A and the wax. Then, a toner for comparison containing the wax at the same content (mass %) as that of the above-mentioned toner and not containing the resin A as a binder resin was prepared, and its endothermic quantity was measured in accordance with the above-mentioned temperature program. Thus, a heat of melting $\Delta H_{high}2$ of only the wax in the toner was obtained. Then, a difference between the $\Delta H_{high}1$ and the $\Delta H_{high}2$ was obtained to determine the heat of melting $\Delta H_{high}$ derived from the resin A in the toner.

C. Measurement of $\Delta H_{low}$

About 5 mg of a sample were precisely weighed and put in a pan made of aluminum to provide a sample pan. The sample pan was inserted into the measurement part, and an empty pan made of aluminum as a reference was inserted into the reference part. The Pt covers were attached respectively to the measurement part and the reference part.

Then, the endothermic quantity of the toner was measured in accordance with the following temperature program under a condition of a nitrogen flow rate of 30 ml/min through use of a calibration file created at a temperature increase speed of 10° C./min.

Step 1: Keep the temperature at −10° C. for 5 minutes.

Step 2: Increase the temperature from −10° C. to 180° C. at a temperature increase speed of 10° C./min.

Step 3: Keep the temperature at 180° C. for 10 minutes.

Step 4: Decrease the temperature from 180° C. to −10° C. at a temperature decrease speed of 10° C./min.

Step 5: Keep the temperature at −10° C. for 10 minutes.

Step 6: Increase the temperature from −10° C. to 180° C. at a temperature increase speed of 10° C./min.

The endothermic quantity was measured in accordance with the program, and the endothermic quantity curve obtained in Step 6 (second temperature increase process) was analyzed for heat of melting. Specifically, the $\Delta H_{low}$ was determined from the area of a peak derived from the resin A among endothermic peaks having appeared on an endothermic side with respect to the base line.

Further, in the case where the toner contains a wax in addition to the resin A, the melting peak temperature of the resin A is close to that of the wax, and hence the melting peaks overlap each other, resulting in difficulty in peak separation in some cases.

In such a case, first, regarding the endothermic quantity curve obtained in Step 6 of the toner, a sum $\Delta H_{low}1$ of the heat of melting of the resin A and that of the wax is determined from the total area of the overlapping melting peaks of the resin A and the wax. Then, a toner for comparison containing the wax at the same content (mass %) as that of the above-mentioned toner and not containing the resin A as a binder resin was prepared, and its endothermic quantity was measured in accordance with the above-mentioned temperature program. Thus, a heat of melting $\Delta H_{low}2$ of only the wax in the toner was obtained.

Then, a difference between the $\Delta H_{low}1$ and the $\Delta H_{low}2$ was obtained to determine the heat of melting $\Delta H_{low}$ derived from the resin A in the toner.

<Measurement of Melting Points of Resin A and Wax>

The melting points of the resin A and the wax were measured in accordance with ASTM D3418-82 through use of an input compensation type differential scanning calorimeter "DSC8500" (manufactured by PerkinElmer, Inc.).

More specifically, the melting points were measured through use of the same temperature program and calibration files as those of the measurement of the $\Delta H_{low}$ under the conditions of a sample mass of 5 mg, a temperature increase speed of 10° C./min, and a nitrogen flow rate of 30 mL/min. In the endothermic quantity curve obtained in Step 6 (second temperature increase process), the peak temperature of the maximum endothermic peak was used to determine each melting point.

<Measurement of Glass Transition Temperature (Tg) of Resin B>

The Tg of the resin B was measured in accordance with ASTM D3418-82 through use of an input compensation type differential scanning calorimeter "DSC8500" (manufactured by PerkinElmer, Inc.).

More specifically, the Tg was measured through use of the same program as that of the measurement of the $\Delta H_{low}$ under the conditions of a sample weight of 5 mg, a temperature increase speed of 10° C./min, and a nitrogen flow rate of 30 mL/min.

In the endothermic quantity curve obtained in Step 6 (second temperature increase process), a change in base line involved in a specific heat change was observed in the range of a temperature of 40 to 100° C., and an intersection between a line intermediate of base lines before and after the specific heat change and the differential thermal curve was defined as the Tg of the resin B.

<Measurement of Softening Point of Resin B>

The softening point of the resin B is measured through use of a constant-pressure extrusion system capillary rheometer "flow characteristic-evaluating apparatus Flow Tester CFT-500D" (manufactured by Shimadzu Corporation) in accordance with the manual attached to the apparatus. In this apparatus, a measurement sample filled in a cylinder is increased in temperature to be melted while a predetermined load is applied to the measurement sample with a piston from above, and the melted measurement sample is extruded from a die in a bottom part of the cylinder. At this time, a flow curve representing a relationship between a piston descent amount and the temperature can be obtained.

In the present invention, a "melting temperature in a ½ method" described in the manual attached to the "flow characteristic-evaluating apparatus Flow Tester CFT-500D" is defined as a softening point. Note that the melting temperature in the ½ method is calculated as described below. First, ½ of a difference between a descent amount $S_{max}$ of the piston at a time when the outflow is finished and a descent amount $S_{min}$ of the piston at a time when the outflow is started is determined (The ½ of the difference is defined as X. $X=(S_{max}-S_{min})/2$). Then, the temperature in the flow curve when the descent amount of the piston reaches the sum of X and $S_{min}$ in the flow curve is the melting temperature in the ½ method.

The measurement sample is obtained by subjecting about 1.0 g of a sample to compression molding for about 60 seconds under about 10 MPa through use of a tablet compressing machine (for example, NT-100H, manufactured by NPa SYSTEM Co., Ltd.) under an environment of 25° C. to form the sample into a cylindrical shape having a diameter of about 8 mm.

The measurement conditions of the CFT-500D are as described below.

Test mode: heating method
Temperature increase speed: 4° C./min
Starting temperature: 50° C.
Reached temperature: 200° C.

<Measurement of Weight-average Molecular Weight by GPC>

A weight-average molecular weight is measured by stabilizing a column in a heat chamber at 40° C. and flowing THF as a solvent to the column at 40° C. at a flow velocity of 1 mL per minute to inject about 100 µL of a THF sample solution to the column.

For measuring the molecular weight of a sample, a molecular weight distribution of the sample was obtained from a relationship between the count value and the logarithmic value of a calibration curve created through use of several kinds of monodisperse polystyrene standard samples.

For example, a standard polystyrene sample having a molecular weight of about $10^2$ to $10^7$ manufactured by Tosoh Corporation or Showa Denko Co., Ltd. is used as the standard polystyrene sample for creating the calibration curve, and it is preferred that about 10 standard polystyrene samples be used.

Further, a refractive index (RI) detector is used as a detector. Note that it is appropriate to combine, as a column, multiple commercially available polystyrene gel columns. Examples thereof include a combination of shodex GPC KF-801, 802, 803, 804, 805, 806, 807, and 800P manufactured by Showa Denko Co., Ltd., and a combination of TSK-gel G1000H ($H_{XL}$), G2000H ($H_{XL}$), G3000H ($H_{XL}$), G4000H ($H_{XL}$), G5000H ($H_{XL}$), G6000H ($H_{XL}$), G7000H ($H_{XL}$), and TSK guard column manufactured by Tosoh Corporation.

Further, a sample is produced as described below.

A sample was put in THF and left to stand for 5 hours. Then, the sample was shaken sufficiently so as to be dissolved in THF until coalescence of the sample disappeared. The dissolution temperature was basically set to 25° C., and the sample was dissolved at a temperature in the range of 25 to 50° C. in accordance with the solubility of the sample. After that, the resultant was further left to stand still at 25° C. for 12 hours or more. In this case, the time during which the sample was left to stand in THF was adjusted to 24 hours. After that, the resultant was passed through a sample treatment filter (pore size: 0.2 µm or more and 0.5 µm or less, for example, Myshori-Disk H-25-2 (manufactured by Tosoh Corporation) or the like can be used) to provide a sample of GPC. Further, the concentration of the sample was adjusted so that a resin component had a concentration of 0.5 mg/mL or more and 5.0 mg/mL or less.

<Measurement of Acid Values of Resin A and Resin B>

An acid value is a milligram number of potassium hydroxide required for neutralizing an acid contained in 1 g of a sample. The acid values of the resin A and the resin B were measured in accordance with JIS K 0070-1992, specifically, the following procedure.

(1) Preparation of Reagent 1.0 g of phenolphthalein was dissolved in 90 mL of ethyl alcohol (95 vol %), and ion exchange water was added to the resultant to provide 100 mL of a phenolphthalein solution.

7 g of special grade potassium hydroxide are dissolved in 5 mL of water, and ethyl alcohol (95 vol %) is added to the resultant to provide 1 L of a solution. The solution is put in a container having alkali resistance so as not to come into contact with a carbon dioxide gas and the like, and is left to stand for three days. After that, the solution is filtered to provide a potassium hydroxide solution. The potassium hydroxide solution thus obtained is stored in the container having alkali resistance. The factor of the potassium hydroxide solution is determined by putting 25 mL of 0.1-mol/L hydrochloric acid in an Erlenmeyer flask, adding drops of the phenolphthalein solution to the hydrochloric acid, titrating the resultant with the potassium hydroxide solution, and obtaining the amount of the potassium hydroxide solution used for neutralization. Hydrochloric acid prepared in accordance with JIS K 8001-1998 is used as the 0.1-mol/L hydrochloric acid.

(2) Operation (A) Main Test 2.0 g of a sample of a pulverized resin are precisely weighed in a 200-mL Erlenmeyer flask, and 100 mL of a mixed solution of toluene and ethanol (2:1) are added to the flask to dissolve the sample over five hours. The dissolution temperature was basically set to 25° C., and the sample was dissolved at a temperature in the range of 25 to 60° C. in accordance with the solubility of the resin. Then, drops of the phenolphthalein solution as an indicator are added to the resultant, and the mixture thus obtained is titrated with the potassium hydroxide solution. Note that the titration is finished when the indicator continues to exhibit a pale red color for about 30 seconds.

(B) Blank Test

The same titration as that in the above-mentioned operation is performed except that the sample is not used (that is, only the mixed solution of toluene and ethanol (2:1) is used).

(3) The result thus obtained is substituted into the following expression to calculate an acid value:

$$A=[(C-B) \times f \times 5.61]/S$$

where A represents an acid value (mgKOH/g), B represents an addition amount (mL) of the potassium hydroxide solution in the blank test, C represents an addition amount (mL) of the potassium hydroxide solution in the main test, f represents the factor of the potassium hydroxide solution, and S represents the sample (g).

<Measurement of Hydroxyl Values of Resin A and Resin B>

A hydroxyl value is a milligram number of potassium hydroxide required for neutralizing acetic acid bonded to a hydroxyl group when 1 g of a sample is acetylated. The hydroxyl values of the resin A and the resin B were measured in accordance with JIS K 0070-1992, specifically, the following procedure.

(1) Preparation of Reagent 25 g of special grade acetic anhydride are put in a 100-mL volumetric flask, and pyridine is added so as to provide an entire amount of 100 mL. The resultant is shaken sufficiently to provide an acetylated reagent. The obtained acetylated reagent is stored in a brown bottle so as not to come into contact with moisture, a carbon dioxide gas, and the like.

1.0 g of phenolphthalein is dissolved in 90 mL of ethyl alcohol (95 vol %), and ion exchange water is added to the resultant to provide 100 mL of a phenolphthalein solution.

35 g of special grade potassium hydroxide are dissolved in 20 mL of water, and ethyl alcohol (95 vol %) is added to the resultant to provide 1 L of a solution. The solution is put in a container having alkali resistance so as not to come into contact with a carbon dioxide gas and the like, and is left to stand for three days. After that, the solution is filtered to provide a potassium hydroxide solution. The potassium hydroxide solution thus obtained is stored in the container having alkali resistance. The factor of the potassium hydroxide solution is determined by putting 25 mL of 0.5-mol/L hydrochloric acid in an Erlenmeyer flask, adding drops of the phenolphthalein solution to the hydrochloric acid, titrating the resultant with the potassium hydroxide solution, and obtaining the amount of the potassium hydroxide solution used for neutralization. Hydrochloric acid prepared in accordance with JIS K 8001-1998 is used as the 0.5-mol/L hydrochloric acid.

(2) Operation (A) Main Test 1.0 g of a sample of a pulverized resin is precisely weighed in a 200-mL round bottom flask, and 5.0 mL of the acetylated reagent are precisely added to the sample through use of a whole pipette. In this case, when the sample is not dissolved in the acetylated reagent easily, a small amount of special grade toluene is added to the sample to dissolve it.

A small funnel is put on the mouth of the flask, and the flask is heated with about 1 cm of the bottom part thereof soaked in a glycerin bath at about 97° C. In order to prevent the temperature of the neck of the flask from increasing owing to the heat of the bath in this case, it is preferred that the base of the neck of the flask be covered with a cardboard having a round hole.

One hour later, the flask is taken out of the glycerin bath and is left to cool down. After the flask is left to cool down, 1 mL of water is added through the funnel, and the flask is shaken to subject acetic anhydride to hydrolysis. In order to perform the hydrolysis further completely, the flask is heated again in the glycerin bath for 10 minutes. After the flask is left to cool down, the walls of the funnel and the flask are washed with 5 mL of ethyl alcohol.

Drops of the phenolphthalein solution as an indicator are added to the resultant, and the mixture thus obtained is titrated with the potassium hydroxide solution. Note that the titration is finished when the indicator continues to exhibit a pale red color for about 30 seconds.

(B) Blank Test

The same titration as that in the above-mentioned operation is performed except that the sample of the resin is not used.

(3) The result thus obtained is substituted into the following expression to calculate a hydroxyl value:

$$A=[\{(B-C) \times 28.05 \times f\}/S]+D$$

where A represents a hydroxyl value (mgKOH/g), B represents an addition amount (mL) of the potassium hydroxide solution in the blank test, C represents an addition amount (mL) of the potassium hydroxide solution in the main test, f represents the factor of the potassium hydroxide solution, S represents the sample (g), and D represents an acid value (mgKOH/g) of the resin.

<Method of Measuring Weight-average Particle Diameter (D4) of Toner>

The weight-average particle diameter (D4) of the toner was measured with the number of effective measurement channels of 25,000 by using a precision particle size distribution-measuring apparatus based on a pore electrical resistance method provided with a 100-μm aperture tube "Coulter Counter Multisizer 3" (trademark, manufactured by Beckman Coulter, Inc.) and dedicated software included thereto "Beckman Coulter Multisizer 3 Version 3.51" (manufactured by Beckman Coulter, Inc.) for setting measurement conditions and analyzing measurement data. Then, the measurement data was analyzed to calculate the diameter.

An electrolyte solution prepared by dissolving special grade sodium chloride in ion-exchanged water so as to have a concentration of about 1 mass %, for example, an "ISOTON II" (manufactured by Beckman Coulter, Inc.) can be used in the measurement.

It should be noted that the dedicated software was set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, an electrolyte solution is set to an ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm to 60 μm.

A specific measurement method is as described below.

(1) About 200 ml of the electrolyte solution are charged into a 250-mL round-bottom beaker made of glass dedicated for the Multisizer 3. The beaker is set in a sample stand, and the electrolyte solution in the beaker is stirred with a stirrer rod at 24 rotations/sec in a counterclockwise direction. Then, dirt and bubbles in the aperture tube are removed by the "aperture flush" function of the analytical software.

(2) About 30 mL of the electrolyte solution are charged into a 100-mL flat-bottom beaker made of glass. About 0.3 mL of a diluted solution prepared by diluting a "Contaminon N" (a 10-mass % aqueous solution of a neutral detergent for washing a precision measuring device formed of a nonionic surfactant, an anionic surfactant, and an organic builder, and having a pH of 7 manufactured by Wako Pure Chemical Industries, Ltd.) with ion-exchanged water by three parts by mass fold is added as a dispersant to the electrolyte solution.

(3) An ultrasonic dispersing unit "Ultrasonic Dispension System Tetora 150" (manufactured by Nikkaki Bios Co., Ltd.) in which two oscillators each having an oscillatory frequency of 50 kHz are built so as to be out of phase by 180° each other and which has an electrical output of 120 W is prepared. A predetermined amount of ion-exchanged water is charged into the water tank of the ultrasonic dispersing unit. About 2 mL of the Contaminon N are charged into the water tank.

(4) The beaker in the section (2) is set in the beaker fixing hole of the ultrasonic dispersing unit, and the ultrasonic dispersing unit is operated. Then, the height position of the beaker is adjusted in order that the liquid level of the electrolyte solution in the beaker may resonate with an ultrasonic wave from the ultrasonic dispersing unit to the fullest extent possible.

(5) About 10 mg of toner are gradually added to and dispersed in the electrolyte solution in the beaker in the section (4) in a state in which the electrolyte solution is irradiated with the ultrasonic wave. Then, the ultrasonic dispersion treatment is continued for an additional 60 seconds. It should be noted that the temperature of water in the water tank is appropriately adjusted so as to be 10° C. or more and 40° C. or less upon ultrasonic dispersion.

(6) The electrolyte solution in the section (5) in which the toner has been dispersed is dropped with a pipette to the round-bottom beaker in the section (1) set in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. It should be noted that an "average diameter" on the "analysis/volume statistics (arithmetic average)" screen of the dedicated software when the dedicated software is set to show a graph in a vol % unit is the weight-average particle diameter (D4).

<Confirmation of Presence/Absence of Bond Between Molecular End of Resin A and Crystal Nucleating Agent>

The presence/absence of a bond between the molecular end of the resin A and the crystal nucleating agent was confirmed through use of MALDI-TOF MS (Reflex III manufactured by Bruker Daltonics).

2 mg of a resin sample were precisely weighed, and 2 mL of chloroform were added to dissolve the resin sample, thereby preparing a sample solution. Although the resin A which is a material for the toner is used as the resin sample, a toner containing the resin A may be used instead in the case where it is difficult to obtain the resin A.

Next, 20 mg of 2,5-dihydroxybenzoic acid (DHBA) were precisely weighed, and 1 mL of chloroform was added to dissolve DHBA, thereby preparing a matrix solution.

Then, 3 mg of sodium trifluoroacetate (NaTFA) were precisely weighed, and 1 mL of acetone was added to dissolve NaTFA, thereby preparing an ionization assistant solution.

25 μL of the sample solution, 50 μL of the matrix solution, and 5 μL of the ionization assistant solution thus prepared were mixed, and the mixture was added dropwise to a sample plate for MALDI analysis and then dried to provide a measurement sample.

In the mass spectrum obtained, the assignment of each peak in an oligomer region (m/Z was 2,000 or less) was performed to confirm whether or not a peak corresponding to composition containing the crystal nucleating agent bonded to the molecular end was present, and thus it was determined whether or not the molecular end of the resin A and the crystal nucleating agent were bonded to each other.

EXAMPLES

The present invention is hereinafter described more specifically by way of examples. However, the embodiments of the present invention are not limited to the examples. Note that, in the examples, the number of parts refers to parts by mass.

Production Example of Resin A1-1

1,10-decanediol as an alcohol monomer and 1,10-decanedioic acid as an acid monomer were supplied to a reaction vessel equipped with a nitrogen introduction tube, a dehydration tube, a stirrer, and a thermocouple in blending amounts shown in Table 1.

Then, 1 part by mass of tin dioctoate was added as a catalyst to the mixture based on 100 parts by mass of the total amount of the monomers, and the resultant was reacted for 7 hours while water was being distilled under normal atmospheric pressure by heating the resultant to 140° C. under a nitrogen atmosphere.

Then, the resultant was reacted while the temperature was being increased to 200° C. at 10° C./hour and reacted for 2 hours after the temperature reached 200° C. Then, the inside of the reaction vessel was reduced in pressure to 5 kPa or less, and the resultant was reacted at 200° C. for 2 hours.

After that, the reaction vessel was gradually opened to be returned the pressure therein to normal atmospheric pressure, followed by sampling. Then, a crystal nucleating agent (n-octadecanoic acid) shown in Table 1 was added to the resultant, and the resultant was reacted at 200° C. for 2 hours under normal atmospheric pressure. The sampled resin had an acid vale of 2 mgKOH/g. After that, the inside of the reaction vessel was again reduced in pressure to 5 kPa or less, and the resultant was reacted at 200° C. for 2 hours to provide a resin A1-1.

Table 2 shows various physical properties of the resin A1-1 thus obtained.

From the mass spectrum of MALDI-TOF MS of the obtained resin A1-1, it was confirmed that n-octadecanoic acid was bonded to the molecular end of the resin A.

TABLE 1

| | Monomer configuration | | | | | | | | |
|---|---|---|---|---|---|---|---|---|---|
| Resin A | Alcohol component | SP value | Molar ratio | Acid component | SP value | Molar ratio | Crystal nucleating agent | Molar ratio | C1-C2 |
| A1-1 | 1,10-decanediol (10) | 9.84 | 100.0 | 1,10-decanedioic acid (10) | 9.97 | 100.0 | n-octadecanoic acid (18) | 4.0 | 0 |
| A1-2 | 1,10-decanediol (10) | 9.84 | 100.0 | 1,10-decanedioic acid (10) | 9.97 | 100.0 | n-octadecanoic acid (18) | 0.4 | 0 |
| A1-3 | 1,10-decanediol (10) | 9.84 | 100.0 | 1,10-decanedioic acid (10) | 9.97 | 100.0 | n-octadecanoic acid (18) | 10.0 | 0 |
| A2 | 1,8-octanediol (8) | 10.23 | 100.0 | 1,10-decanedioic acid (10) | 9.97 | 100.0 | n-octadecanoic acid (18) | 4.0 | −2 |
| A3 | 1,10-decanediol (10) | 9.84 | 100.0 | 1,8-octanedioic acid (8) | 10.41 | 100.0 | 1-octadecanol | 4.0 | 2 |
| A4 | 1,12-dodecanediol (12) | 9.57 | 100.0 | 1,8-octanedioic acid (8) | 10.41 | 100.0 | n-octadecanoic acid (18) | 4.0 | 4 |
| A5 | 1,10-decanediol (10) | 9.84 | 100.0 | 1,14-tetradecanedioic acid (14) | 9.44 | 100.0 | n-octadecanoic acid (18) | 4.0 | −4 |
| A6 | 1,6-hexanediol (6) | 10.83 | 100.0 | 1,10-decanedioic acid (10) | 9.97 | 100.0 | n-octadecanoic acid (18) | 4.0 | −4 |
| A7 | 1,10-decanediol (10) | 9.84 | 100.0 | 1,14-tetradecanedioic acid (14) | 9.44 | 100.0 | n-tetracosanoic acid (24) | 4.0 | −4 |
| A8 | 1,6-hexanediol (6) | 10.83 | 100.0 | 1,10-decanedioic acid (10) | 9.97 | 100.0 | n-hexadecanoic acid (16) | 4.0 | −4 |
| A9 | 1,10-decanediol (10) | 9.84 | 100.0 | 1,14-tetradecanedioic acid (14) | 9.44 | 100.0 | n-hexacosanoic acid (26) | 4.0 | −4 |
| A10 | 1,6-hexanediol (6) | 10.83 | 100.0 | 1,10-decanedioic acid (10) | 9.97 | 100.0 | n-dodecanoic acid (12) | 4.0 | −4 |
| A11 | 1,8-octanediol (8) | 10.23 | 100.0 | Terephthalic acid (—) | | 100.0 | n-dodecanoic acid (12) | 4.0 | — |
| A12 | 1,9-nonanediol (9) | 10.02 | 100.0 | 1,12-dodecanedioic acid (12) | 9.66 | 100.0 | — | 0 | −3 |
| A13 | 1,10-decanediol (10) | 9.84 | 100.0 | 1,6-hexanedioic acid (6) | 11.10 | 100.0 | n-dodecanoic acid (12) | 4.0 | 4 |
| A14 | 1,6-hexanediol (6) | 10.83 | 112.0 | 1,12-dodecanedioic acid (12) | 9.66 | 100.0 | n-octadecanoic acid (18) | 16.0 | 6 |

TABLE 2

| | Physical properties of resin A | | | | | |
|---|---|---|---|---|---|---|
| Resin A | Sa (cal/cm$^3$)$^{1/2}$ | Melting point (° C.) | ΔH (J/g) | Weight-average molecular weight Mwa | Acid value (mgKOH/g) | Hydroxyl value (mgKOH/g) |
| A1-1 | 9.91 | 76 | 129 | 21,000 | 2 | 14 |
| A1-2 | 9.91 | 76 | 129 | 21,000 | 2 | 21 |
| A1-3 | 9.91 | 76 | 129 | 21,000 | 2 | 5 |
| A2 | 10.10 | 71 | 125 | 22,000 | 3 | 18 |
| A3 | 10.13 | 71 | 123 | 22,000 | 2 | 14 |
| A4 | 9.99 | 75 | 105 | 20,500 | 2 | 14 |
| A5 | 9.64 | 82 | 108 | 25,000 | 4 | 16 |
| A6 | 10.40 | 68 | 104 | 23,000 | 2 | 14 |
| A7 | 9.64 | 82 | 113 | 25,000 | 4 | 16 |
| A8 | 10.40 | 68 | 101 | 23,000 | 2 | 14 |
| A9 | 9.64 | 82 | 115 | 30,500 | 2 | 14 |
| A10 | 10.40 | 68 | 99 | 17,000 | 5 | 18 |
| A11 | 10.26 | 92 | 64 | 20,000 | 2 | 14 |
| A12 | 9.84 | 75 | 95 | 24,500 | 6 | 47 |
| A13 | 10.47 | 67 | 88 | 15,000 | 4 | 16 |
| A14 | 10.25 | 70 | 108 | 11,000 | 2 | 14 |

Production Examples of Resins A1-2, A1-3, and A2 to A14

Resins A1-2, A1-3, and A2 to A14 were obtained in the same way as in the production example of the resin A1-1 except for changing monomer species, crystal nucleating agent species, and blending amounts thereof in the production example of the resin A1-1 as described in Table 1. Table 2 shows physical properties thereof.

After the temperature of the resultant reached 210° C., the inside of the reaction vessel was reduced in pressure to 5 kPa or less, and the resultant was subjected to polymerization condensation under conditions of 210° C. and 5 kPa or less to provide a resin B1. In this case, the polymerization time was adjusted so that the softening point of the resin B1 to be obtained became a value shown in Table 4. Table 4 shows various physical properties of the obtained resin B1.

TABLE 3

| | Acid (mol) | | | | | | Alcohol (mol) | | | | |
|---|---|---|---|---|---|---|---|---|---|---|---|
| | Monomer species | | | | | | | | | | |
| | TPA | IPA | TMA | FA | AA | DSA | BPA-PO | BPA-EO | EG | PG | NPG |
| | SP value | | | | | | | | | | |
| Resin B | 10.28 | 10.28 | 11.37 | 12.83 | 11.10 | 9.33 | 9.51 | 9.74 | 14.11 | 12.70 | 8.37 |
| B1 | 89 | 0 | 0 | 0 | 0 | 0 | 44 | 38 | 18 | 0 | 0 |
| B2 | 65 | 0 | 6 | 0 | 0 | 0 | 65 | 35 | 0 | 0 | 0 |
| B3 | 66 | 1 | 13 | 0 | 0 | 0 | 57.4 | 12.6 | 30 | 0 | 0 |
| B4 | 40 | 16 | 0 | 0 | 0 | 24 | 70 | 50 | 0 | 0 | 0 |
| B5 | 71 | 0 | 0 | 0 | 0 | 0 | 100 | 0 | 0 | 0 | 0 |
| B6 | 100 | 0 | 0 | 0 | 0 | 0 | 0 | 0 | 42 | 0 | 58 |
| B7 | 89 | 0 | 0 | 0 | 0 | 0 | 44 | 38 | 18 | 0 | 0 |
| B8 | 89 | 0 | 0 | 0 | 0 | 0 | 44 | 38 | 18 | 0 | 0 |
| B9 | 50 | 0 | 18 | 0 | 0 | 0 | 0 | 0 | 0 | 150 | 0 |
| B10 | 100 | 0 | 21 | 80 | 0 | 0 | 114 | 13 | 0 | 0 | 0 |

Further, in the mass spectra of MALDI-TOF MS of the obtained resins A1-2, A1-3, A2 to A11, A13, and A14, a peak of a composition in which a crystal nucleating agent was bonded to a molecular end of the resin A was confirmed, and it was confirmed that the molecular end and the crystal nucleating agent were bonded to each other.

Production Example of Resin B1

Monomers in blending amounts shown in Table 3 were supplied to a reaction vessel equipped with a nitrogen introduction tube, a dehydration tube, a stirrer, and a thermocouple, and 1.5 parts by mass of dibutyltin as a catalyst were added to the monomers based on 100 parts by mass of the total amount of the monomers.

TPA; Terephthalic acid (SP value: 10.28)
IPA; Isophthalic acid (SP value: 10.28)
TMA; Trimellitic acid (SP value: 11.37)
FA; Fumaric acid (SP value: 12.83)
AA; Adipic acid (SP value: 11.10)
DSA; Dodecenyl succinic acid (SP value: 9.33)
BPA-PO; Bisphenol A-PO 2 mol adduct (SP value: 9.51)
BPA-EO; Bisphenol A-EO 2 mol adduct (SP value: 9.74)
EG; Ethylene glycol (SP value: 14.11)
PG; 1,2-Propylene glycol (SP value: 12.70)
NPG; Neopentyl glycol (SP value: 8.37)

TABLE 4

| | Physical properties of resin B | | | | | |
|---|---|---|---|---|---|---|
| Resin B | Sb $(cal/cm^3)^{1/2}$ | Weight-average molecular weight Mwb | Tg (° C.) | Softening point (° C.) | Acid value (mgKOH/g) | Hydroxyl value (mgKOH/g) |
| B1 | 10.36 | 20,000 | 59 | 116 | 7 | 14 |
| B2 | 9.92 | 87,000 | 66 | 128 | 6 | 13 |
| B3 | 10.71 | 4,000 | 54 | 92 | 5 | 31 |
| B4 | 9.76 | 49,000 | 59 | 113 | 11 | 32 |
| B5 | 9.83 | 30,000 | 62 | 106 | 5 | 21 |
| B6 | 10.53 | 7,000 | 53 | 96 | 9 | 28 |
| B7 | 10.36 | 2,800 | 51 | 79 | 15 | 18 |
| B8 | 10.36 | 121,000 | 63 | 132 | 17 | 23 |
| B9 | 12.04 | 4,300 | 58 | 96 | 40 | 55 |
| B10 | 10.68 | 20,000 | 58 | 135 | 20 | 5 |

Then, the resultant was rapidly increased in temperature to 180° C. under normal atmospheric pressure with a nitrogen atmosphere, and was then subjected to polymerization condensation by distilling water while heating the resultant at a temperature increase speed of 10° C./hour from 180° C. to 210° C.

Production Example of Resin B2

Monomers shown in Table 3 except trimellitic anhydride (TMA) were supplied to a reaction vessel equipped with a nitrogen introduction tube, a dehydration tube, a stirrer, and a thermocouple, and thereafter, dibutyltin oxide was added to the mixture. The mixture was rapidly increased in temperature to 180° C. under normal atmospheric pressure with a nitrogen atmosphere.

Then, the resultant was subjected to polymerization condensation by distilling water while heating the resultant from 180° C. to 210° C. at a temperature increase speed of 10° C./hour. After the temperature reached 210° C., the inside of the reaction vessel was reduced in pressure to 5 kPa or less, and the resultant was reacted for 2 hours under conditions of 210° C. and 5 kPa or less.

Then, the inside of the reaction vessel was temporarily returned to normal atmospheric pressure, and TMA in a blending amount shown in Table 3 was added to the resultant. The inside of the reaction vessel was reduced in pressure again to 5 kPa or less. Then, the resultant was subjected to polymerization condensation under the conditions of 210° C. and 5 kPa or less until the softening point thereof was reached the softening point shown in Table 4, to produce a resin B2. Table 4 shows various physical properties of the obtained resin B2.

Production Example of Resin B3

Monomers shown in Table 3 except trimellitic anhydride (TMA) were supplied to a reaction vessel equipped with a nitrogen introduction tube, a dehydration tube, a stirrer, and a thermocouple, and thereafter, dibutyltin oxide was added to the mixture. The mixture was rapidly increased in temperature to 170° C. under normal atmospheric pressure with a nitrogen atmosphere.

Then, the resultant was subjected to polymerization condensation by distilling water while heating the resultant from 170° C. to 195° C. at a temperature increase speed of 10° C./hour. After the temperature reached 195° C., the inside of the reaction vessel was reduced in pressure to 5 kPa or less, and the resultant was reacted for 0.3 hour under a reduced pressure condition.

Then, the inside of the reaction vessel was temporarily returned to normal atmospheric pressure, and TMA in a blending amount shown in Table 3 was added to the resultant. The inside of the reaction vessel was reduced in pressure again to 5 kPa or less. Then, the resultant was subjected to polymerization condensation under the conditions of 195° C. and 5 kPa or less until the softening point thereof was reached the softening point shown in Table 4, to produce a resin B3. Table 4 shows various physical properties of the obtained resin B3.

Productions Examples of Resins B4 to B6

Resins B4 to B6 were produced in the same way as in the production example of the resin B1 except for changing the material monomers in the production example of the resin B1 to those shown in Table 3. Table 4 shows various physical properties of the obtained resins B4 to B6.

Production Examples of Resins B7 and B8

Resins B7 and B8 were produced in the same way as in the production example of the resin B1 except for changing the softening points of the resins to be obtained to those shown in Table 4 by adjusting polymerization times under the conditions of 210° C. and 5 kPa or less. Table 4 shows various physical properties of the obtained resins B7 and B8.

Production Example of Resin B9

Monomers shown in Table 3 except trimellitic anhydride (TMA) were supplied to a reaction vessel equipped with a nitrogen introduction tube, a dehydration tube, a stirrer, and a thermocouple, and thereafter, 3.0 parts by mass of tetrabutoxy titanate were added as a polymerization catalyst to the mixture based on 100 parts by mass of the total amount of the monomers. The resultant was reacted for 8 hours while generated water was being distilled at 180° C. under a nitrogen stream. Then, the resultant was increased in temperature to 230° C., and reacted while generated propylene glycol was being distilled under a nitrogen stream. When the softening point reached 78° C., the resultant was cooled to 180° C., and TMA in the amount shown in Table 3 was added to the resultant. After the resultant was reacted for 1 hour in a sealed state under normal atmospheric pressure, a resin was taken out. The resin thus taken out was cooled to room temperature, and was then pulverized into particles to provide a resin B9. Table 4 shows various physical properties of the obtained resin B9.

Production Example of Resin B10

Monomers shown in Table 3 except trimellitic anhydride (TMA) were supplied to a reaction vessel equipped with a nitrogen introduction tube, a dehydration tube, a stirrer, and a thermocouple, and thereafter, 3.0 parts by mass of tetrabutoxy titanate were added as a polymerization catalyst to the mixture based on 100 parts by mass of the total amount of the monomers. The resultant was reacted for 5 hours while generated water was being distilled at 230° C. under a nitrogen stream. When an acid value reached 2 mg KOH/g or less, the resultant was cooled to 180° C. and rapidly increased in temperature to 180° C. under normal atmospheric pressure with a nitrogen atmosphere.

After that, the resultant was subjected to polymerization condensation by distilling water while heating the resultant from 180° C. to 210° C. at a temperature increase speed of 10° C./hour. When the temperature reached 210° C., the inside of the reaction vessel was reduced in pressure to 5 kPa or less, and the resultant was reacted for 2 hours under conditions of 210° C. and 5 kPa or less.

Then, the inside of the reaction vessel was temporarily returned to normal atmospheric pressure, and TMA in a blending amount shown in Table 3 was added to the resultant. After the resultant was reacted for 2 hours in a closed state under normal atmospheric pressure, the resultant was further reacted under conditions of 230° C. and kPa or less to be subjected to polymerization condensation until the softening point thereof was reached the softening point shown in Table 4. Thus, a resin B10 was produced. Table 4 shows various physical properties of the obtained resin B10.

Production Example of Toner 1

| | |
|---|---|
| Resin A1-1 | 20.0 parts by mass |
| Resin B1 | 80.0 parts by mass |
| Carbon black | 5.0 parts by mass |
| Fischer-Tropsch wax (melting point: 105° C.) | 5.0 parts by mass |
| Aluminum 3,5-di-t-butylsalicylate compound | 0.5 part by mass |

The above-mentioned materials were mixed with a Henschel mixer (FM-75 type, Mitsui Miike Machinery Co., Ltd.), and thereafter, the mixture was kneaded with a twin screw kneader (PCM-30 manufactured by Ikegai Corp.) at a rotation number of 3.3 s$^{-1}$ while the temperature of a kneader barrel was adjusted so that the temperature of a kneaded resin became the softening point of the resin B+10° C.

The kneaded material thus obtained was cooled and coarsely pulverized with a hammer mill to 1 mm or less to provide a coarsely pulverized product. The coarsely pulverized product thus obtained was finely pulverized with a mechanical pulverizer (T-250 manufactured by FREUND-TURBO CORPORATION). Further, the finely pulverized powder thus obtained was classified through use of a multi-division classifying machine using the Coanda effect to provide negative friction electrification type toner particles having a weight-average particle diameter (D4) of 7.1 μm.

To 100 parts by mass of the obtained toner particles, 1.0 part by mass of titanium oxide fine particles having a number average particle diameter of primary particles of 50 nm subjected to surface treatment with 15 mass % of isobutyl trimethoxysilane and 0.8 part by mass of hydrophobic silica fine particles having a number average particle diameter of primary particles of 16 nm subjected to surface treatment with 20 mass % of hexamethyldisilazane, and the contents were mixed with a Henschel mixer (FM-75 manufactured by Mitsui Miike Machinery Co., Ltd.) to provide a toner 1. Table 5 shows various physical properties of the obtained toner 1.

multiple resins were used as the resin B as shown in Table 5. Table 5 shows various physical properties of the obtained toners 2 to 28.

Example 1

In this example, a commercially available color laser printer "Color Laser Jet CP4525 (manufactured by Hewlett-Packard Company)" was used as an image-forming apparatus to be used for evaluating the obtained toner 1. The following evaluation was performed with the toner in the evaluating machine being changed to the toner 1 produced in this example.

(1) High-speed Fixability

The fixing unit of a commercially available color laser printer "Color Laser Jet CP4525 (manufactured by Hewlett-Packard Company)" was taken out, and then such an external fixing unit that the fixing temperature, fixing nip pressure, and process speed of a fixing device could be set arbitrarily was produced.

A color laser copier sheet (80 g/m² A4 paper manufactured by Canon Inc.) was used, and a black cartridge was used as a

TABLE 5

|  | Resin A | Resin B | Mass ratio Resin A:Resin B | $\Delta H_{high}$ (J/g) | $\Delta H_{low}$ (J/g) | $(\Delta H_{low} - \Delta H_{high})/\Delta H_{low} \times 100$ (%) |
|---|---|---|---|---|---|---|
| Toner 1 | A1-1 | B1 | 20:80 | 17.2 | 19.3 | 11.1 |
| Toner 2 | A1-2 | B1 | 20:80 | 14.0 | 15.4 | 9.1 |
| Toner 3 | A1-3 | B1 | 20:80 | 18.0 | 20.0 | 10.2 |
| Toner 4 | A2 | B1 | 20:80 | 15.1 | 18.9 | 20.0 |
| Toner 5 | A3 | B1 | 20:80 | 13.0 | 20.3 | 36.1 |
| Toner 6 | A4 | B1 | 20:80 | 11.2 | 17.8 | 37.0 |
| Toner 7 | A5 | B2 | 20:80 | 18.0 | 19.8 | 9.1 |
| Toner 8 | A6 | B3 | 20:80 | 10.0 | 17.0 | 41.1 |
| Toner 9 | A5 | B1 | 20:80 | 20.0 | 21.5 | 7.0 |
| Toner 10 | A6 | B1 | 20:80 | 8.0 | 15.4 | 47.9 |
| Toner 11 | A7 | B1 | 20:80 | 21.1 | 22.4 | 6.0 |
| Toner 12 | A8 | B1 | 20:80 | 7.0 | 13.8 | 49.3 |
| Toner 13 | A9 | B1 | 20:80 | 23.1 | 24.1 | 4.2 |
| Toner 14 | A10 | B1 | 20:80 | 5.2 | 14.9 | 65.2 |
| Toner 15 | A9 | B1 | 28:72 | 33.0 | 34.4 | 4.1 |
| Toner 16 | A10 | B1 | 12:88 | 3.1 | 9.2 | 66.2 |
| Toner 17 | A9 | B1 | 37:53 | 44.0 | 45.5 | 3.2 |
| Toner 18 | A10 | B1 | 7:93 | 2.3 | 7.0 | 67.1 |
| Toner 19 | A11 | B1 | 20:80 | 2.0 | 6.3 | 68.1 |
| Toner 20 | A12 | B4 | 20:80 | 0.0 | 0.0 | 0.0 |
| Toner 21 | A9 | B1 | 4:96 | 1.1 | 3.5 | 68.3 |
| Toner 22 | A10 | B1 | 42:58 | 47.0 | 48.5 | 3.1 |
| Toner 23 | A13 | B5 | 20:80 | 2.2 | 8.5 | 74.1 |
| Toner 24 | A10 | B6 | 20:80 | 24.0 | 24.2 | 1.0 |
| Toner 25 | A9 | B7 | 20:80 | 0.9 | 3.4 | 73.8 |
| Toner 26 | A10 | B8 | 20:80 | 47.0 | 47.0 | 0.0 |
| Toner 27 | A14 | B9/B10 mixture (Ratio 7.5/85) | 7.5:92.5 | 8.1 | 8.1 | 0.1 |
| Toner 28 | A14 | B9/B10 mixture (Ratio 17.5/65) | 17.5:82.5 | 19.0 | 19.0 | 0.0 |

$\Delta H_{high}$ (J/g): Heat of melting derived from resin A measured at temperature increase speed of 100° C./min through use of input compensation type differential scanning calorimeter
$\Delta H_{low}$ (J/g): Heat of melting derived from resin A measured at temperature increase speed of 10° C./min through use of input compensation type differential scanning calorimeter
$(\Delta H_{low} - \Delta H_{high})/\Delta H_{high} \times 100$ (J/g): Change rate of heat of melting derived from resin A owing to difference in temperature increase speed Production Examples of Toners 2 to 28

Toners 2 to 28 were produced in the same way as in the production example of the toner 1 except for changing the kinds of the resin A and the resin B, and the mass ratio between the resin A and the resin B in the production example of the toner 1 as shown in Table 5. In the toners 27 and 28, cartridge to be used for evaluation under an environment at a temperature of 23° C. and a relative humidity of 50%.

That is, a product toner was removed from a commercially available black cartridge, and the inside of the cartridge was cleaned with an air blow. After that, 150 g of the toner 1 of the present invention were filled into the cartridge and evaluated.

Note that each product toner was removed from each of magenta, yellow, and cyan stations, and magenta, yellow, and cyan cartridges whose toner remaining amount detection mechanisms had been made invalid were inserted into the respective stations for evaluation.

After that, an unfixed solid black image was output so that the loading amount of a toner reached 0.75 mg/cm$^2$.

The unfixed solid black image was fixed by setting the fixing temperature of a fixing unit at 150° C. and increasing a process speed in an increment of 20 mm/sec in the range of 240 mm/sec to 400 mm/sec. The surface of the obtained solid black image was rubbed with lens-cleaning paper under a load of about 100 g reciprocally five times, and the condition under which a density decrease ratio between the image densities before and after the rubbing became about 10% or less was defined as a process speed at which the image was able to be fixed. Then, the highest process speed satisfying a density decrease ratio of 10% or less was defined as a fixing upper limit speed. As a toner had a higher fixing upper limit speed, the toner was determined to be more excellent in low-temperature fixability (high-speed low-temperature fixability) even in a high-speed fixing unit, and determination was performed based on the following standard. In the present invention, the levels up to C are acceptable.

A: The fixing upper limit speed is 400 mm/sec or more.
B: The fixing upper limit speed is 340 mm/sec or more and less than 400 mm/sec.
C: The fixing upper limit speed is 240 mm/sec or more and less than 340 mm/sec.
D: The fixing upper limit speed is less than 240 mm/sec.

(2) Low-pressure Fixability

In the above-mentioned fixing test, the unfixed solid black image was fixed by setting the fixing temperature of a fixing unit at 150° C. and increasing a fixing nip surface pressure in an increment of 0.02 MPa in the range of 0.08 MPa to 0.24 MPa. The surface of the obtained solid black image was rubbed with lens-cleaning paper under a load of about 100 g reciprocally five times, and the condition under which a density decrease ratio between the image densities before and after the rubbing became about 10% or less was defined as a process speed at which the image was able to be fixed.

Then, the lowest fixing nip surface pressure satisfying a density decrease ratio of 10% or less was defined as a fixing lower limit fixing nip surface pressure. As a toner had a lower fixing lower limit fixing nip surface pressure, the toner was determined to be more excellent in low-temperature fixability (high-speed fixability) even in a fixing unit having a low fixing nip surface pressure. Then, determination was performed based on the following standard. In the present invention, the levels up to C are acceptable.

A: The fixing lower limit fixing nip surface pressure is less than 0.10 MPa.
B: The fixing lower limit fixing nip surface pressure is 0.10 MPa or more and less than 0.14 MPa.
C: The fixing lower limit fixing nip surface pressure is 0.14 MPa or more and less than 0.20 MPa.
D: The fixing lower limit fixing nip surface pressure is 0.20 MPa or more.

(3) Heat-resistance Storage Stability of Toner Image

In the above-mentioned fixing test, the unfixed solid black image was fixed by setting the fixing temperature at 150° C., the fixing nip pressure at 0.25 MPa, and the process speed at 200 mm/sec to provide a fixed image sample.

Two fixed image samples thus obtained were used as one set and stacked so that the solid black images were faced each other. The samples were put on a flat platform, and a predetermined pressure was applied to the image portions by placing a weight. Under this condition, the samples were left to stand for 7 days in an environmental test chamber at a temperature of 40° C. and a relative humidity of 50%, and the pressure was removed by taking the samples out of the chamber.

In this case, 9 sets of the fixed image samples were prepared and evaluated by changing a pressure (uncontrolled pressure) applied to each image portion while the samples were left to stand in an increment of 0.4 kPa in the range from 0.4 kPa (corresponding to 500 sheets of A4 paper of 80 g/m$^2$) to 4.0 kPa (corresponding to 5,000 sheets of A4 paper of 80 g/m$^2$).

Then, the largest pressure at which the fixed image samples after being left to stand for 7 days were able to be peeled without blocking was defined as an uncontrolled upper limit pressure. As a toner had a higher uncontrolled upper limit pressure, the toner was determined to be more excellent in heat-resistance storage stability of a toner image, and evaluation was performed based on the following determination standard. In the present invention, the levels up to C are acceptable.

A: The uncontrolled upper limit pressure is 4.0 kPa or more.
B: The uncontrolled upper limit pressure is 3.0 kPa or more and less than 4.0 kPa.
C: The uncontrolled upper limit pressure is 1.6 kPa or more and less than 3.0 kPa.
D: The uncontrolled upper limit pressure is 0.4 kPa or more and less than 1.6 kPa.
E: Blocking occurs at an uncontrolled pressure of 0.4 kPa, and the uncontrolled upper limit pressure is less than 0.4 kPa.

(4) Long-term Storage Stability of Toner Image (Test for Curling Property)

In the above-mentioned fixing test, the unfixed solid black image was fixed under conditions of a fixing temperature of 150° C., a fixing nip pressure of 0.25 MPa, and a process speed of 200 mm/sec. The solid black image thus obtained was left to stand in an environment test chamber at a temperature of 40° C. and a relative humidity of 50% for 30 days. After the solid black image was left to stand, the solid black image was put on a flat platform, and one side of the A4 paper in a longitudinal direction was fixed with a tape. In this case, an angle formed by the flat platform and the paper was measured when the other side of the paper was curled, and thus curling property was evaluated. As the angle was smaller, the long-term storage property was determined to be more satisfactory, and determination was performed based on the following standard. In the present invention, the levels up to C are acceptable.

A: The angle is less than 10°.
B: The angle is 10° or more and less than 20°.
C: The angle is 20° or more and less than 30°.
D: The angle is 30° or more and less than 40°.
E: The angle is 40° or more.

Accordingly, in Example 1, a satisfactory result was obtained in any evaluation. Table 6 shows evaluation results of Example 1.

TABLE 6

|  |  | High-speed fixability | A to D | Low-pressure fixability | A to D | Heat-resistance storage property of toner image | A to E | Long-term storage stability of toner image | A to E |
|---|---|---|---|---|---|---|---|---|---|
| Example 1 | Toner 1 | 400 | A | 0.08 | A | 4.0 | A | 0 | A |
| Example 2 | Toner 2 | 400 | A | 0.08 | A | 4.0 | A | 0 | A |
| Example 3 | Toner 3 | 400 | A | 0.08 | A | 4.0 | A | 0 | A |
| Example 4 | Toner 4 | 400 | A | 0.08 | A | 4.0 | A | 2 | A |
| Example 5 | Toner 5 | 400 | A | 0.08 | A | 4.0 | A | 3 | A |
| Example 6 | Toner 6 | 400 | A | 0.08 | A | 3.6 | B | 3 | A |
| Example 7 | Toner 7 | 380 | B | 0.1 | B | 4.0 | A | 2 | A |
| Example 8 | Toner 8 | 400 | A | 0.08 | A | 3.2 | B | 11 | B |
| Example 9 | Toner 9 | 360 | B | 0.14 | C | 4.0 | A | 3 | A |
| Example 10 | Toner 10 | 400 | A | 0.08 | A | 2.8 | C | 12 | B |
| Example 11 | Toner 11 | 340 | B | 0.14 | C | 4.0 | A | 5 | A |
| Example 12 | Toner 12 | 400 | A | 0.08 | A | 2.8 | C | 12 | B |
| Example 13 | Toner 13 | 320 | C | 0.16 | C | 4.0 | A | 3 | A |
| Example 14 | Toner 14 | 400 | A | 0.08 | A | 2.4 | C | 20 | C |
| Example 15 | Toner 15 | 300 | C | 0.16 | C | 4.0 | A | 3 | A |
| Example 16 | Toner 16 | 400 | A | 0.08 | A | 2.4 | C | 21 | C |
| Example 17 | Toner 17 | 240 | C | 0.18 | C | 4.0 | A | 3 | A |
| Example 18 | Toner 18 | 400 | A | 0.08 | A | 1.6 | C | 22 | C |
| Example 19 | Toner 19 | 340 | B | 0.12 | B | 1.6 | C | 23 | C |
| Comparative Example 1 | Toner 20 | 340 | B | 0.24 | D | 0.4 or less | E | 4 | A |
| Comparative Example 2 | Toner 21 | 380 | B | 0.08 | A | 0.4 | D | 29 | C |
| Comparative Example 3 | Toner 22 | 220 | D | 0.18 | C | 4.0 | A | 9 | A |
| Comparative Example 4 | Toner 23 | 400 | A | 0.08 | A | 1.6 | C | 35 | D |
| Comparative Example 5 | Toner 24 | 240 | C | 0.24 | D | 4.0 | A | 7 | A |
| Comparative Example 6 | Toner 25 | 400 | A | 0.08 | A | 0.4 | D | 43 | E |
| Comparative Example 7 | Toner 26 | 220 | D | 0.24 | D | 4.0 | A | 5 | A |
| Comparative Example 8 | Toner 27 | 240 | C | 0.24 | D | 4.0 | A | 10 | B |
| Comparative Example 9 | Toner 28 | 340 | B | 0.24 | D | 4.0 | A | 10 | B |

Examples 2 to 19 and Comparative Examples 1 to 9

Evaluation results of Examples 2 to 19 and Comparative Examples 1 to 9 were obtained in the same way as in Example 1 except for changing the toner to be used for evaluation in Example 1 to those shown in Table 6. Table 6 shows evaluation results of Examples 2 to 19 and Comparative Examples 1 to 9.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-141016, filed Jun. 22, 2012, which is hereby incorporated by reference herein in its entirety.

What is claimed is:

1. A toner, comprising toner particles, each of which contains a binder resin containing a resin A and a resin B, and a coloring agent,
wherein:
(1) the resin A comprises a resin including a moiety capable of forming a crystalline structure;
(2) the resin A comprises an aliphatic polyester resin including a unit derived from an alcohol component and a unit derived from an acid component;

in the unit derived from an alcohol component, a ratio of a unit derived from an aliphatic diol having 6 or more and 12 or less carbon atoms is 85 mol % or more; and
in the unit derived from an acid component, a ratio of a unit derived from an aliphatic dicarboxylic acid having 6 or more and 14 or less carbon atoms is 85 mol % or more,
(3) the resin A is a resin in which a crystal nucleating agent is bonded to an end of a molecule forming a resin part,
(4) the resin B comprises a resin which is free of any moieties capable of forming a crystalline structure; and
(5) in a measurement of an endothermic quantity of the toner by the use of an input compensation type differential scanning calorimeter, $\Delta H_{high}$ and $\Delta H_{low}$ satisfy the following relationships of Expressions 1 and 2:

$$2 \leq \Delta H_{high} \leq 45 \qquad \text{Expression 1}$$

$$3 \leq \{(\Delta H_{low} - \Delta H_{high})/\Delta H_{low}\} \times 100 \leq 70 \qquad \text{Expression 2}$$

where
the $\Delta H_{high}$ (J/g) represents a heat of melting derived from the binder resin observed when the toner is melted by increasing its temperature temporarily to 180° C. at a temperature increase speed of 100° C./min and then solidified by being cooled to −10° C. at a temperature decrease speed of 100° C./min, and the temperature is increased again to 180° C. at a temperature increase speed of 100° C./min, and
the $\Delta H_{low}$ (J/g) represents a heat of melting derived from the binder resin observed when the toner is melted by increasing its temperature temporarily to 180° C. at a temperature increase speed of 10° C./min and then solidified by being cooled to −10° C. at a temperature decrease speed of 10° C./min, and the temperature is increased again to 180° C. at a temperature increase speed of 10° C./min at a temperature increase speed of 10° C./min.

2. The toner according to claim 1, wherein a ratio between a content of the resin A and a content of the resin B in the toner is 5:95 to 40:60 in terms of mass.

3. The toner according to claim 1, wherein Sa and Sb satisfy the following relationship of Expression 3:

$$-0.40 \leq Sb - Sa \leq 0.80 \qquad \text{Expression 3}$$

wherein the Sa $((cal/cm^3)^{1/2})$ represents an SP value of the resin A, and the Sb $((cal/cm^3)^{1/2})$ represents an SP value of the resin B.

4. The toner according to claim 3, wherein the Sa is 9.00 $(cal/cm^3)^{1/2}$ or more and 10.50 $(cal/cm^3)^{1/2}$ or less.

5. The toner according to claim 1, wherein the resin A has a melting point of 60° C. or more and 120° C. or less.

6. The toner according to claim 1, wherein the resin B comprises a polyester resin.

7. The toner according to claim 1, wherein C1 and C2 satisfy the following Expression 5:

$$-2 \leq C1 - C2 \leq 2 \qquad \text{Expression 5}$$

where the C1 represents a carbon number of the unit derived from the aliphatic diol of the resin A, and the C2 represents a carbon number of the unit derived from the aliphatic dicarboxylic acid of the resin A.

* * * * *